(12) United States Patent
Wang et al.

(10) Patent No.: US 12,726,490 B2
(45) Date of Patent: Sep. 1, 2026

(54) WEBSITE CLASSIFICATION

(71) Applicant: Commonwealth Scientific and Industrial Organisation, Acton (AU)

(72) Inventors: Shuo Wang, Joondalup (AU); Mahathir Almashor, Joondalup (AU); Alsharif Abuadbba, Joondalup (AU); Raj Gaire, Joondalup (AU); Seyit Camtepe, Joondalup (AU); Surya Nepal, Joondalup (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 21 days.

(21) Appl. No.: 18/579,316

(22) PCT Filed: Dec. 16, 2022

(86) PCT No.: PCT/AU2022/051525
§ 371 (c)(1),
(2) Date: Jan. 12, 2024

(87) PCT Pub. No.: WO2023/115110
PCT Pub. Date: Jun. 29, 2023

(65) Prior Publication Data
US 2024/0333730 A1 Oct. 3, 2024

(30) Foreign Application Priority Data
Dec. 21, 2021 (AU) ................................ 2021904184

(51) Int. Cl.
*H04L 9/40* (2022.01)
*G06F 21/56* (2013.01)

(52) U.S. Cl.
CPC .......... *H04L 63/1416* (2013.01); *G06F 21/56* (2013.01); *G06F 2221/2119* (2013.01)

(58) Field of Classification Search
CPC ............. H04L 63/1416; H04L 63/1483; H04L 63/168; H04L 63/1441; G06F 2221/2119;
(Continued)

(56) References Cited

U.S. PATENT DOCUMENTS 9,002,832 B1 * 4/2015 Patel ....................... G06F 16/35 707/723
9,183,499 B1 * 11/2015 Krivokon ................. G06N 5/02
(Continued)

OTHER PUBLICATIONS

International Search Report and Written Opinion for International Application No. PCT/AU2022/051525, mailed Mar. 8, 2023.
(Continued)

*Primary Examiner* — Abdulkader M Alriyashi
(74) *Attorney, Agent, or Firm* — Wolf, Greenfield & Sacks, P.C.

(57) ABSTRACT

This disclosure relates to classifying websites. A processor calculates importance values between a test website and multiple neighbour websites that are connected by way of one or more hyperlinks between that neighbour website and the test website. The processor then selects one or more of the multiple neighbour websites, based on the importance value. For each website in the selected one or more of the multiple neighbour websites and the test website, the processor determines content features for the website, and evaluates a trained machine learning model for the website, based on the content features to calculate multiple output values for the website. The processor then aggregates corresponding output values for each of the test website and the selected one or more of the multiple neighbour websites to calculate a classification value that classifies the test website.

18 Claims, 12 Drawing Sheets

(58) Field of Classification Search
CPC ...... G06F 16/958; G06F 21/56; G06F 16/951; G06F 21/51; G06F 21/562; G06F 21/6218
See application file for complete search history.

(56) References Cited

U.S. PATENT DOCUMENTS

| | | | |
|---|---|---|---|
| 10,104,113 B1 * | 10/2018 | Stein | H04L 63/1425 |
| 2010/0186088 A1 | 7/2010 | Banerjee et al. | |
| 2019/0155952 A1 | 5/2019 | Tang et al. | |
| 2020/0304540 A1 | 9/2020 | Chang et al. | |
| 2021/0406322 A1 * | 12/2021 | Guy | G06F 16/957 |

OTHER PUBLICATIONS

Becchetti et al., Link-based characterization and detection of web spam. Proceedings of the Second International Workshop on Adversarial Information Retrieval on the Web (AIRWeb) 2006. Aug. 10, 2006:1-8.

Somesha et al., Efficient deep learning techniques for the detection of phishing websites. Sādhanā. Jun. 27, 2020;45:1-8.

* cited by examiner 350
361
363
362
BoW
364
365
381
351
353
352
BoW
354
356
357
359
Aggr
Soft max
355
358
391
371
373
372
BoW
374
375

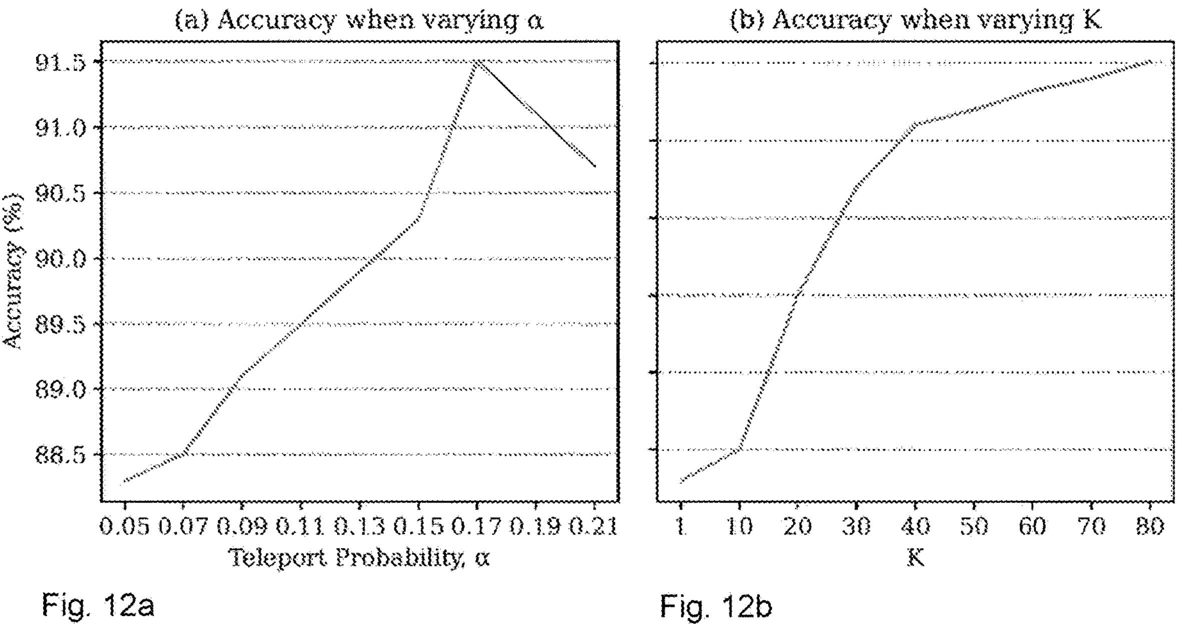
Fig. 12a
Fig. 12b
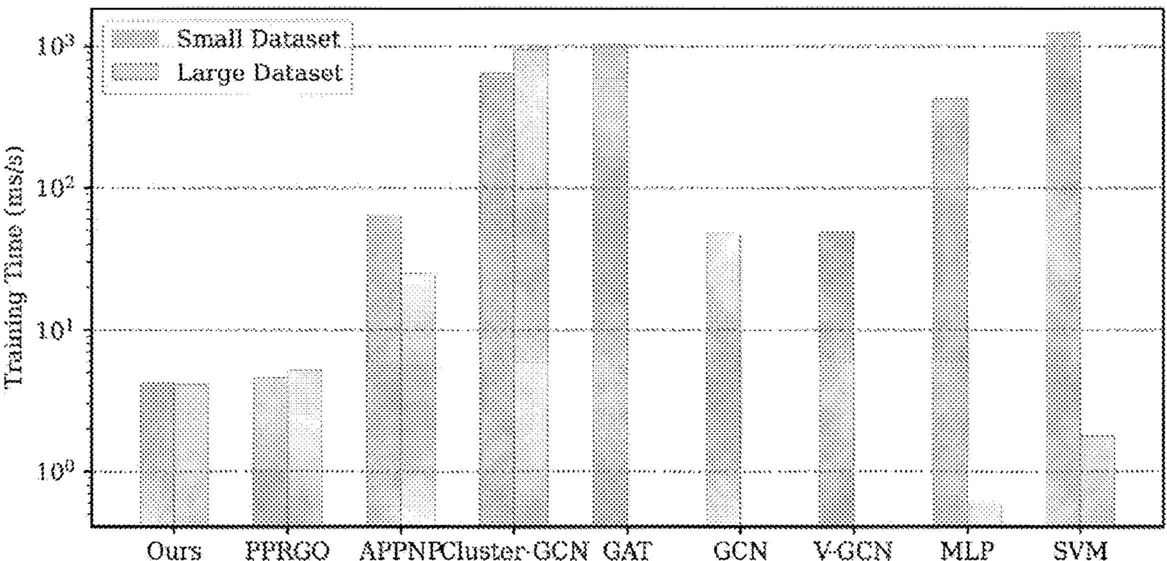
Fig. 13

WEBSITE CLASSIFICATION

CROSS-REFERENCE TO RELATED APPLICATIONS

The present application is a national stage filling under 35 U.S.C. 371 of International Patent Application Serial No. PCT/AU2022/051525, filed Dec. 16, 2022, which claims priority from Australian Provisional Patent Application No. 2021904184, filed on 21 Dec. 2021, the contents of which are incorporated herein by reference in their entirety.

TECHNICAL FIELD

This disclosure relates to classifying websites.

BACKGROUND

Malicious websites have been the focus of many cyber threat intelligence vendors as they attempt to identify and block possible attacks like phishing. Known domains of bad websites are added to deny-lists that are updated regularly as and when they are detected. For example, a majority of web browsers utilize the Google Safe Browsing API or Microsoft ATP to prevent unsuspecting end-users from accessing already known phishing and malware links. The diametrically opposed approach is the allow-list: trusted Internet domains such as "vic.gov.au" are added to a pool of authorized sites that users may visit. Depending on the strictness of the operating environment, those may be the only sites allowed, such as access from a military or government installation. However, there are inherent drawbacks in both approaches.

Deny-listing is reactive in nature, with protection only after a threat has been detected. There is also the question of lag between detection and prevention, where attacks need only to be active in the first few hours to be successful. Attackers can easily circumvent deny-listing by launching rapid mass-scale campaigns that cycle through lists of domains before defences have a chance to catch up.

On the other hand, allow-list techniques where access to only trusted sites are allowed are often too restrictive and too static. Allow-listing suffers from issues of centralization, restrictiveness, and similar concerns regarding update latency. Simply put, legitimate domains can be excluded just because they have not garnered enough trust amongst either the community or central authority. It is a significant challenge for any allow-listing mechanism to keep up with the numerous new legitimate sites created every day, which imposes severe restrictions on end-users ability to surf the web. White or black listing is also a very labour-intensive process and requires manual interventions to manage and constantly update the list.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A method for classifying a test website comprises:

calculating importance values between the test website and multiple neighbour websites that are connected by way of one or more hyperlinks between that neighbour website and the test website;

selecting one or more of the multiple neighbour websites, based on the importance value;

for each website in the selected one or more of the multiple neighbour websites and the test website;

determining content features for the website, and evaluating a trained machine learning model for the website, based on the content features to calculate multiple output values for the website; and aggregating corresponding output values for each of the test website and the selected one or more of the multiple neighbour websites to calculate a classification value that classifies the test website.

It is an advantage that calculating the multiple output values and the aggregation of the corresponding output values occur in separate steps. This makes it harder for a phisher to create a fake website and fake all of its neighbours that are potentially multi-hops away. The aggregation of the corresponding output values for each of the test website and the multiple neighbour websites also increases efficiency as the classification of the test website does not rely on all connected websites.

In some embodiments, aggregating the corresponding output values is based on a relationship between the test website and selected one of more of the multiple neighbour websites.

In some embodiments, selecting one or more of the multiple neighbour websites comprises selecting of or more neighbour websites with importance values over an importance threshold.

In some embodiments, calculating the importance values between the test website and the multiple neighbour websites comprises propagating a parameter related to the importance value between the test website and the multiple neighbour websites to calculate, for each of the multiple neighbour websites, the importance value based on the parameter.

In some embodiments, calculating the importance value comprises updating the importance value by adding the parameter multiplied by a weight factor.

In some embodiments, the method further comprises initialising the parameter based on whether the test website links to a malicious website.

In some embodiments, the parameter is based on a number of the neighbour websites that link to the malicious website.

In some embodiments, the initialising the parameter comprises dividing the parameter of a first website among websites that link to the first website.

In some embodiments, propagating the parameter comprises selecting one of the multiple neighbour websites based on the parameter calculated for that one of the multiple neighbour websites and propagating the parameter from that selected one of the multiple neighbour websites.

In some embodiments, the method comprises setting the parameter of the selected one of the multiple neighbour websites to a predefined value after propagating the parameter, to indicate that the selected one of the multiple neighbour websites has been processed.

In some embodiments, the method further comprises terminating the propagating in response to the parameter for the multiple neighbour websites being below a termination threshold.

In some embodiments, the method further comprises performing random walks from a starting website, selected from the test website and the multiple neighbour websites, based on the parameter after terminating the propagating, to update the importance value of the starting website.

In some embodiments, the classification value is a probability of the test website being malicious or compromised in a cyber-attack.

In some embodiments, the multiple output values for each website in the selected one or more of the multiple neighbour websites and the test website is a representation of embedded features.

In some embodiments, each of the test website and the selected one or more of the multiple neighbour websites comprises a primary domain.

The method of any one of the preceding claims, wherein the method comprises building a graph of nodes and directed edges, a node representing a website and a directed edge representing a hyperlink between websites, and selecting one or more of the multiple neighbour websites is performed on the graph.

In some embodiments, the method comprises, for each node in the graph, calculating a classification value and classifying the node based on the classification value.

In some embodiments, at least one node is a website on a whitelist, corresponding to a predetermined classification value.

In some embodiments, training the machine learning model comprises calculating a classification value for each node on the graph and minimising a cost between the classification value and node labels obtained from a whitelist and/or blacklist.

In some embodiments, training the machine learning model further comprises aggregating corresponding output values from a pre-trained machine learning model for each of the test website and the selected one or more of the multiple neighbour websites to calculate the classification value for each node on the graph.

In some embodiments, the method further comprises, after classifying each node in the graph, pruning the nodes of the graph according to their classification.

In some embodiments, aggregating the corresponding output values comprises calculating a weighted sum of the corresponding output values.

In some embodiments, aggregating the corresponding output values comprises converting the output values into a probability distribution.

In some embodiments, determining features related to content comprises determining a frequency of words used in the content from a dictionary of words.

In some embodiments, determining features related to content comprises generating a numeric feature vector for each website in the selected one or more of the multiple neighbour websites and the test website and using the numeric feature value as an input to the trained machine learning model.

In some embodiments, the trained machine learning model comprises a neural network. In some embodiments, the neural network has exactly two output values.

Software, when executed by a computer, causes the computer to perform the above method.

A computer system for classifying a test website comprises:

a processor configured to:

calculating importance values between the test website and multiple neighbour websites that are connected by way of one or more hyperlinks between that neighbour website and the test website;

selecting one or more of the multiple neighbour websites, based on the importance value;

for each website in the selected one or more of the multiple neighbour websites and the test website;

determining content features for the website, and evaluating a trained machine learning model for the website, based on the content features to calculate multiple output values for the website; and aggregating corresponding output values for each of the test website and the selected one or more of the multiple neighbour websites to calculate a classification value that classifies the test website.

Optional features provided above with respect to the method, are also optional features with respect to the software and the computer system.

BRIEF DESCRIPTION OF DRAWINGS

FIG. 12*a* illustrates accuracy depending on teleport probability $\alpha$.

FIG. 12*b* illustrates accuracy depending on top-k.

FIG. 13 illustrates the training time of different models on two size of datasets.

DESCRIPTION OF EMBODIMENTS

Figure 1:
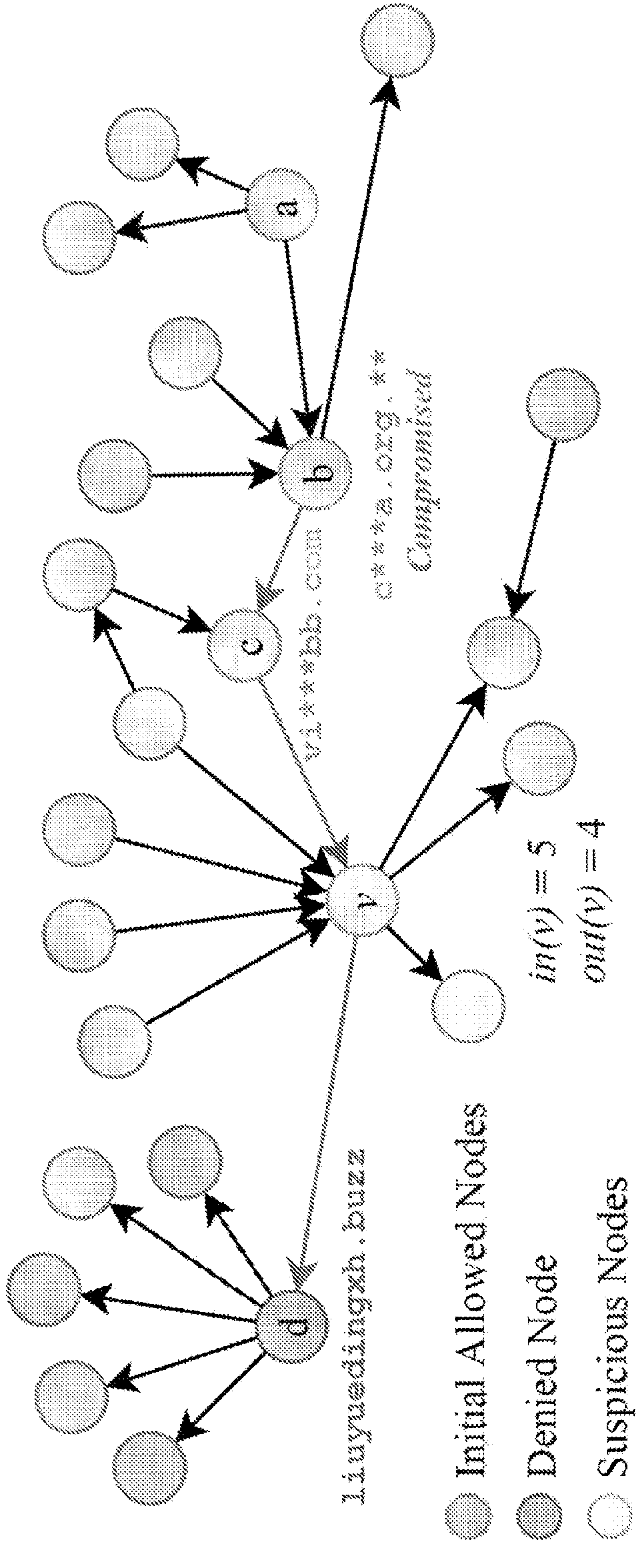
FIG. 1 illustrates an example of On-chain Compromise.

Malicious website detection has been a focus for cybersecurity vendors. The aim is to stem the tide of attacks such as phishing and malware by blocking access to such sites. One practice is to add the domain names of malicious websites to deny-lists (e.g., black-list) as and when they are found. The diametrically opposed approach is the restrictive allow-list (e.g., green-list or white-list): only trusted domains (such as "[.] gov") are added to a pool of authorized sites. Block/allow lists are generally incomplete, passive, and their updates are time- and labour-intensive. Further, due to the sheer amount of possible malicious websites on the Internet with many more being adding constantly, block/allow lists are relatively inefficient at realising the goal for a clean (or pruned) Internet consisting of only trusted and legitimate websites.

Models of the web can be used to investigate and understand malicious website detection at a small scale, rather than using the entire web as a testbed. To model the web, a graph expansion algorithm can be initialized with 56,805 seed domains (initial allow-list) and visiting the default main page for each seed domain to gather outgoing links from their HTML. These links can then be distilled to their basic domain names (e.g., example [.] org for example [.] org/login) and the crawling is repeated recursively. After obtaining the expansion graph and adopting the idea of "transitivity of trust" (where, if A trusts B, and B trusts C, then A would trust C as well), it is expected that all domains are benign, as they are all accessible from trusted seed domains. Surprisingly, malicious nodes and compromised nodes can be found in the graph, indicating the risk that compromised and malicious domains may inadvertently be included.

Therefore, there is a need to identify and filter the entire chain of stealthy compromise-relevant nodes from the compromised node to its target of compromise. It is risky to include these compromised nodes in allow-list, due to potential threats and reputation stolen from the ".org" domain to malicious domains, especially when the embedded hidden hyperlinks in reputable websites are capable of bypassing security checks.

Accordingly, a new type of compromise can be defined, where a node in an allow-list could be directly or indirectly connected to nodes in a deny-list through nested hidden HTML links, resulting in potential reputation damage, malware injection or data theft threats. This new type of compromise can be referred as "On-chain Compromise". The property of On-chain Compromise that distinguishes it from existing malicious or compromise attacks is the two-fold stealthiness:

(i) Content stealthiness: Unlike malicious webpages that have specific patterns, the content of compromised webpages could be totally "clean", e.g., may only contain hyperlinks that are identified as "clean" by third-party security vendors but lay on the path to malicious target. Such hyperlinks could be invisible and continuously updated, thus hard to recognized in real-time. Such attacks are more stealthy and silent than active attacks, making them easier to remain undetected for a longer period of time.

(ii) Topology (intent) stealthiness: On-chain Compromises are generally conducted in a diluent manner to avoid detection, i.e., the compromised nodes are buried deep along the paths away from the targets in the deny-list (denied nodes, as intent of the compromise), i.e., there are many moderate intermediate nodes between the compromised nodes and denied nodes. These moderate intermediate nodes are commonly identified as "clean" by third-party security vendors. Generally, they are intended to attack the ranking of a web page in search engine results by building a hyperlink topology. A real-world example is presented in FIG. 1, where nodes a and b are initial allowed nodes; nodes c and v are moderate intermediate (suspicious) nodes that are not detected as malicious domains by existing detection tools; a node d is a malicious domain in deny-list. It is found that, the node b (c*s.org., an anti-child abuse non-profit website) is compromised by nodes c and v, and is finally connected with the denied node d.

Unlike one-step malicious/benign URL prediction, monitoring the expansion graph involves the identification of on-chain compromise in stealthy and deep connections. Due to the content stealthiness and topology stealthiness of the on-chain compromise, none of the existing web malicious analysis methods are applied to this new problem, summarized as the following three technical challenges:

Challenge 1: Sparse labels and limited supervision information. Due to content stealthiness, there is no supervision information available for extracting malicious patterns. Additionally, only a small percentage of nodes could be detected as denied nodes, resulting in inaccurate predictions as a result of insufficient supervision information.

Challenge 2: Efficiency. Existing domain examination methods either base on individual node features or only focus on the topology (e.g., applying PageRank and TrustRank as a semi-automatic technique), resulting in a high false positive rate and low accuracy (especially when compromised nodes are considered). Besides, lightweight feature extraction is necessary for fast inference.

Challenge 3: Scalability and portability. Web-compromising behaviours have a typical long chain of influence and are stealthy in nature, which is beyond the 2-hops scope of ordinary graph learning schemes.

As on-chain compromises cannot be detected directly due to their stealthiness, a two-step process is required: (i) measuring the suspicion of each domain node in the expanded graph to be denied nodes; and (ii) post-processing for the recognition and analysis of compromised nodes. To conquer the aforementioned challenges, this disclosure presents a method and system that leverages the strength of both machine learning (based on individual node features) and web topology analysis (label propagation in the global view). More particularly, this disclosure provides a fast and scalable graph neural network-based semi-supervised node classification model for domain compromise threat measurement, consisting of two components: (i) Semi-supervised Denied Node Classification for Suspicion Prediction and (ii) Compromise Pruning and Warning as Post-processing.

Totally malicious URLs/domain nodes that could be detected by third-party security vendors represent only one type and a small fraction of denied nodes (178 malicious nodes are identified out of 1.7M nodes). Other denied nodes should be customized according to specific scenarios. For example, a deny-list for government organizations should also contain the domains that lead to gambling and pornography web pages, but the labels are still sparse (11,686 gambling and pornography domains are labelled as denied nodes, less than 1% of all nodes). Such customized denied node labels are always considered legitimate by many threat intelligence vendors. Therefore, this disclosure utilizes the global structure information to propagate label information and globally determine the probability that a domain node is denied. The prediction confidence is used as a suspicion score. Finally, an enhanced allow-list could be acquired by pruning high suspicion nodes from the graph as per the predicted suspicion, while the compromised nodes are the original "benign" nodes that have high suspicious scores.

Considering both node feature and structural information among nodes, website domain classification, in essence, is semi-supervised node classification on more than millions of nodes. A fast and scale propagation procedure with a more extensive neighbourhood would be helpful to give the model more information, especially for domain prediction, which is a typical long chain of influence and sparsely labelled setting.

In an embodiment, trustworthiness (which may also be referred to as suspicion) is defined as the possibility of a domain being malicious or compromised in cyber-attacks and represented as a numerical value in the range of [0,1]. Then, the inherent trustworthiness is automatically and actively estimated to understand the links between various domains and organically build a list of domain names with a high degree of trustworthiness via pruning the nodes with low degree of trustworthiness.

To address aforementioned limitations, this disclosure provides a fast and scaled graph neural network-based semi-supervised node-classification model for domain trustworthiness analysis, using a separated learning procedure and Personalised IncredulityRank (PIR). Personalised IncredulityRank may also be referred to as Personalised InverseRank.

The disclosed method relies on a scale graph neural network with the specific IncredulityRank and efficient approximation of global information propagation, considering both the individual domain features and large-scale hyperlink relations among domains.

The main elements are as follows:

- Construction of a Website Domain Graph baseline dataset (2M nodes, 17M edges, 2000 node features), that is augment with "ground-truth" node labels and sufficient features from HTML of the node for machine learning.
- Considering the malicious behaviours on the web, development of PIR, an algorithmic way of automatically evaluating malicious behaviours propagandistic networks, namely, quantitatively evaluating the untrustworthy web neighbourhoods for a given node.
- Introduction of the Separated Learning model to solve the scalability issue for semi-supervised node classification on a large graph, separating the local neural network-based prediction from the global propagation procedure. The derivation of a global propagation procedure from the top-k PIR estimation, that enhances the efficiency while considering the influence of relevant nodes located multiple hops away.
- Extensive evaluations of the efficiency and accuracy of the disclosed model for domain trustworthy evaluation. The model may achieve more than 90% prediction accuracy with only 0.01% labelled nodes. The accuracy of the pre-trained node-feature predictor, without using any graph information, is boosted from 65% to 87% after incorporating with the global information propagation procedure without any additional training, which would be more practical in industry settings.

Figure 2:
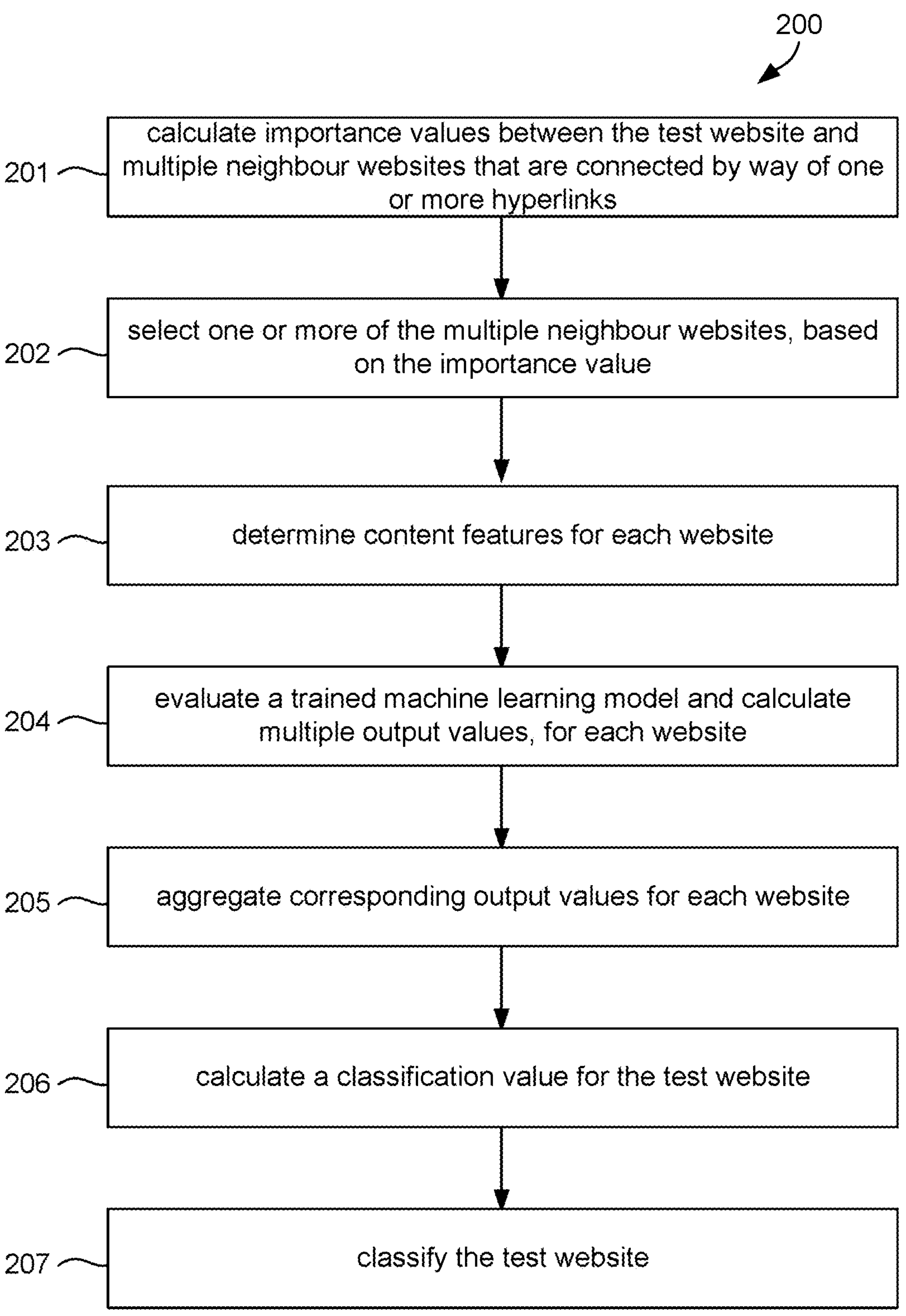
FIG. 2 illustrates a method for classifying a test website.

FIG. 2 illustrates a method for classifying a test website. The method comprises calculating 201 importance values between the test website and multiple neighbour websites that are connected by way of one or more hyperlinks. The importance values are calculated using a modified Personalised PageRank (PPR) procedure, also referred to as PIR. The difference between PIR and PPR is that PIR also accounts for the untrustworthiness of a website's children inversely, thereby penalising the website if it recommends, by way of a hyperlink, an untrustworthiness website. The method further comprises selecting 202 one or more of the multiple neighbour websites, based on the importance value. The selected one or more of the multiple neighbour websites are the top-k important neighbouring websites of the test website, that are determined using PIR procedure. After the top-k important neighbours are determined, the method comprises determining 203 content features for the test website and its top-k important neighbours using HTML. These are surface level features that are related to maliciousness.

In an example, a feature is the frequency that malicious words and symbols appear in the HTML content of the website. For example, these malicious words relate to sexual content, gambling and spamming. The method for classifying 204 a test website further comprises evaluating a trained machine learning model and calculating multiple output values for the test website and its top-k important neighbours. The multiple output values are a local prediction of the trustworthiness of the website, based only on the website's content features. Classifying the test website then comprises aggregating 205 corresponding output values for the test website, which may include its top-k important neighbours.

This is then followed by calculating 206 a classification value. This classification value is for the test website and which may involve a weighted sum of the corresponding output values of the tests website and its top-k important neighbours with the PPR of each top-k neighbour with respect to the test website. After calculating 206 a classification value for the test website, classifying 207 the test website is performed, where the test website is classified as trustworthy or non-trustworthy, based on its classification value. In an example, the classification value is a probability of the test website being malicious or compromised in a cyber-attack.

Figures 3A, 3B:
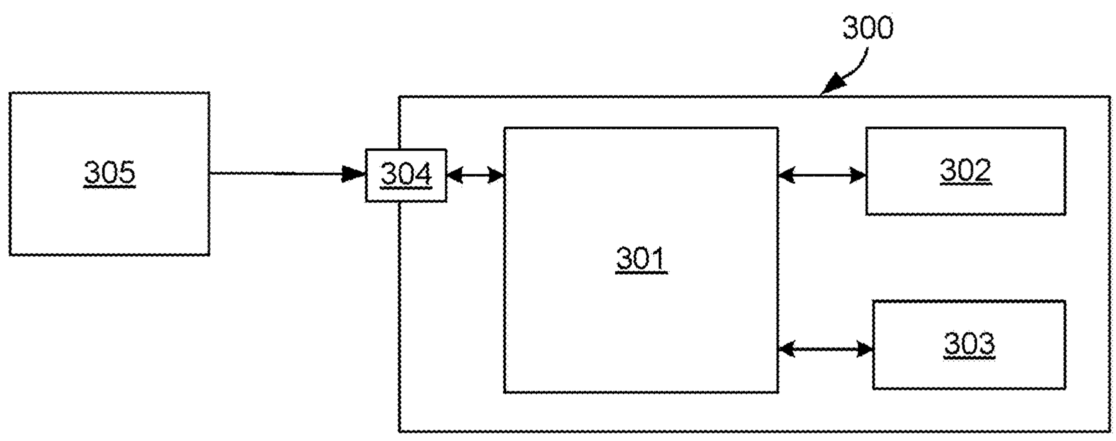
FIG. 3*a* illustrates a computer system for classifying a test website.
FIG. 3*b* illustrates a classification architecture.

FIG. 3*a* illustrates a computer system 300 for classifying a test website. The computer system 300 comprises a processor 301 connected to a program memory 302 and a data memory 303. The program memory 302 is a non-transitory computer readable medium, such as a hard drive, a solid state disk or CD-ROM. Software, that is, an executable program stored on program memory 302 causes the processor 301 to perform the method in FIG. 2, that is, processor 301 calculates importance values between the test website and multiple neighbour websites that are connected by way of one or more hyperlinks, select one or more of the multiple neighbour websites, based on the importance value, determines content features for each website, evaluate a trained machine learning model and calculate multiple output values, for each website, aggregates corresponding output values for each website, calculates a classification value for the test website and classifies the test website. The data memory 303 may store the trained neural network in the form of network parameters that have been optimised for calculating multiple output values, for each website, based on its content features. In one example, the processor 301 performs the training and stores the learned parameters of the machine learning method on data memory 303.

The processor 301 may then store the classification of the test website, as well as the classification value of the test website and the multiple output values of the trained machine learning model on data memory 303, such as on RAM or a processor register. Processor 301 may also send the classification of the test website, as well as the classification value of the test website and the multiple output values of the trained machine learning model, via communication port 304 to a server, such as an internet server 305.

The processor 301 may receive data through all these interfaces, which includes memory access of volatile memory, such as cache or RAM, or non-volatile memory, such as an optical disk drive, hard disk drive, storage server or cloud storage. The computer system 300 may further be implemented within a cloud computing environment, such as a managed group of interconnected servers hosting a dynamic number of virtual machines.

It is to be understood that any receiving step may be preceded by the processor 301 determining or computing the data that is later received. For example, the processor 301 classifies the test website and stores the classification in data memory 303, such as RAM or a processor register. The processor 301 then requests the data from the data memory 303, such as by providing a read signal together with a memory address. The data memory 303 provides the data as a voltage signal on a physical bit line and the processor 301 receives the image data as the input image via a memory interface.

FIG. 2 is to be understood as a blueprint for the software program and may be implemented step-by-step, such that each step in FIG. 2 is represented by a function in a programming language, such as C++ or Java. The resulting source code is then compiled and stored as computer executable instructions on program memory 302.

It is noted that for most humans performing the method 200 manually, that is, without the help of a computer, would be practically impossible. Therefore, the use of a computer is part of the substance of the invention and allows performing the necessary calculations that would otherwise not be possible due to the large amount of data and the large number of calculations that are involved.

In an example, if the test website is determined to be non-trustworthy (in other words, the test website is suspicious), processor 301 may raise an alert to a user to indicated that a suspicion website has been determined. Processor 301 may raise the alert with the classification value determined by performing method 200. In other examples, if the test website is determined to be non-trustworthy, processor 301 may automatically put the test website on a deny-list (blacklist) and deny user from accessing the website.

FIG. **3*b* illustrates an architecture 350 for classifying a website. Architecture 350 is implemented in the form of source code and variables in computer memory 302 and 303. In this example, there is a test website 351 that is to be classified. As described herein in detail, processor 301 selects important neighbours, which in this example comprise a first neighbour website 361 and a second neighbour website 371. There are two further websites 381 and 391 but the processor 301** does not consider those because their importance value is too low.

Processor 301 extracts a bag of words 352 for test website 351 and uses that as an input to a local classifier 353 (e.g., multi-layer perceptron) to calculate two output values 354 and 355. These are also referred to as 'embeddings' herein. Similarly, processor 301 extracts a bag of words 362/372 for first neighbour website 361 and second neighbour website 371, respectively. The processor 301 also uses those as inputs to respective local classifiers 363/373 to calculate respective output values 364/374 and 365/375.

For test website 351, processor 301 now executes an aggregator 356 to aggregate the output value 354 with corresponding output value 364 from first neighbour website 361 and with corresponding output value 374 from second neighbour website 371. Aggregating may involve average, sum, sum of squares or other aggregation. Equally, processor aggregates output values 355, 365, 375.

It is noted that the local classifier 353 is identical (i.e. identical parameter values) to local classifiers 363 and 373. That is, the aggregator 356 aggregates values from the same outputs of the identical classifiers. For example, the local classifier may have a first output for 'good' and a second output for 'bad'. Then, the aggregator 356 aggregates all 'good' outputs to calculate a single aggregated 'good' output 357. The aggregator 356 then aggregates all 'bad' outputs to calculate a single aggregated 'bad' output 358. Finally, there is a softmax so that processor 301 transforms the two output values 357, 358 into a probability distribution, so that both values add up to 1. The result is then the classification of the test website 351.

System Design

Problem Statement

Compromise detection is divided into Suspicion Prediction and Compromise Pruning and Warning. To test the disclosed method in the website domain name scenario, the web is modelled as a graph G=(V,E), where V is the set of vertices that include both the labelled and unlabelled domain names (represented by the homepage of the domain), and E is a set of directed hyperlinks (edges) that connect domains.

Practically, processor 301 collects the HTML of the homepage WebA for each domain node A, which contains multiple hyperlinks to some other web page $\{url_1, url_2, \ldots, url_i\}$. Edges represent hyperlinks from A to each domain name of $\{url_1, url_2, \ldots, url_i\}$. Multiple same hyperlinks are collapsed into a single link and remove self hyperlinks. FIG. **4*b*** presents a graph generated by layer-by-layer crawling. The number of incoming links of a domain $v_i$ is its indegree $in(v_i)$, whereas the number of outgoing links is its outdegree $out(v_i)$. The disclosed system extracts and analyzes many features regarding these nodes to recognize good or malicious domain names successfully. The representation X for each domain node is a D-dimension numeric feature vector extracted from the composition of the main web page's URL and the page's HTML content as collected by a crawler.

Trustworthiness (suspicion) indicates the possibility of a domain being malicious, compromised or compromised-relevant in cyber-attacks and represented as a numerical value $Z_v \in [0,1]$ (e.g., prediction confidence). In this disclosure, compromising intents are considered to be malicious (e.g., malware or phishing venues recognized via third-party security vendors), pornography, and gambling websites (customized compromising intents). Evaluation of domain suspicion is therefore a suspicion prediction, depending on node features and/or graph topology. The trustworthy evaluation of website domain name is a node classification in nature. However, in many practical applications the number of labelled data is little compared to the unlabelled data, where a traditional supervised classification does not achieve accurate predictions. Therefore, a semi-supervised node classification is used to recognize the website domain as trust or distrust. Namely, in graph G, only a small proportion of nodes are labelled, and their relationship among the G with the remaining large amount of unlabelled domains extends the prior labelling knowledge.

A graph-based semi-supervised node classification approach is applied, with decoupled local prediction and global propagation to handle large graph G. Individual domain features derived from its homepage are used, adjacency information derived from the hyperlinks, and partial label information of domains as input data with the disclosed trustworthiness-estimation approach. Training steps then occur recursively and obtain the label prediction results as probabilities of each label class by SoftMax. The structural information of a graph G enables the propagation of the few available labels through the network of G until all the domains in a connected component are given the label and trustworthiness value.

Domains relevant to malware, phishing, spamming, sexual and gambling websites are considered as distrusted (positive), and others are considered trusted (negative) for the semi-supervised node classification. Precision is defined as the number of true positive classifications/number of positive classifications. The Recall is defined as the number of true positive classifications/number of positive examples. The False-Positive rate is defined as the number of false-positive classifications/number of negative examples. The goals of the semi-supervised node classification for website domain name trustworthy are summarized as follows:

1. Given the relative scarcity of actual malicious pages in the set of pages examined, the false positive rate of the classifier is extremely low. The classifier prioritizes Precision over Recall to minimize the false-positive ratio.
2. The classifier achieves high Recall. If the classifier fails to identify the most distrusted domains, it does not satisfactorily substitute a manual method.
3. The classifier tolerates noisy training data and perform well when only obtaining a few labels.
4. The classifier processes a large graph of web pages with low latency. The classifier keeps up with a load.

Separate Learning

For each layer of the typical GNNs, the feature transformation is coupled with the propagation (aggregation) of messages passing among the neighbourhoods. This leads to limitations in terms of the efficiency and scalability of the existing GNNs. For example, expanding the number of layers is beneficial to incorporate information from more distant neighbours, resulting in the over-smoothing and computational prohibition of recursive neighbourhood expansion on large graph. To address these limitations, Separate Learning based on decoupled feature transformation from the propagation is proposed. Namely, the prediction on features for each node is produced locally and independently at first, followed by propagation/aggregation of local predictions via PPR. Formally, the node embedding is defined as $$Z = \text{softmax}\left(\alpha\left(I_n - (1-\alpha)D^{-1/2}\tilde{A}D^{-1/2}\right)^{-1}H\right), \qquad (1)$$

$$H_i = f_\theta(x_i)$$

Here, $\alpha$ is a teleport probability, H is the local prediction matrix for a specific node generated via a neural network $f_\theta$, and Z is the node embedding matrix after propagation. The key point of decoupling learning is how to efficiently calculate the dense propagation matrix $\alpha(I_n-(1-\alpha)D^{-1/2}\bar{A}D^{-1/2})^{-1}$ and pre-computation of PPR, such as a variant of power iteration or sparse approximation.

Overview

This disclosure consists of the Suspicion Prediction and Compromise Pruning. As the amount of labelled data is relatively tiny, semi-supervised graph learning for domain node classification is used to determine whether a domain is compromised or not. This gives rise to a graph based semi-supervised node classification approach. Some examples are motivated by separate learning via decoupling local prediction and global propagation using PPR. This supports a domain name semi-supervised procedure that separates the neural network. This is then applied for making local predictions on individual nodes, from the global message propagation procedure among neighbourhoods. The disclosed method is composed of Individual Feature Extraction, Local Prediction, Personalized Incredulity Ranking, and Global Propagation.

Figure 4A:
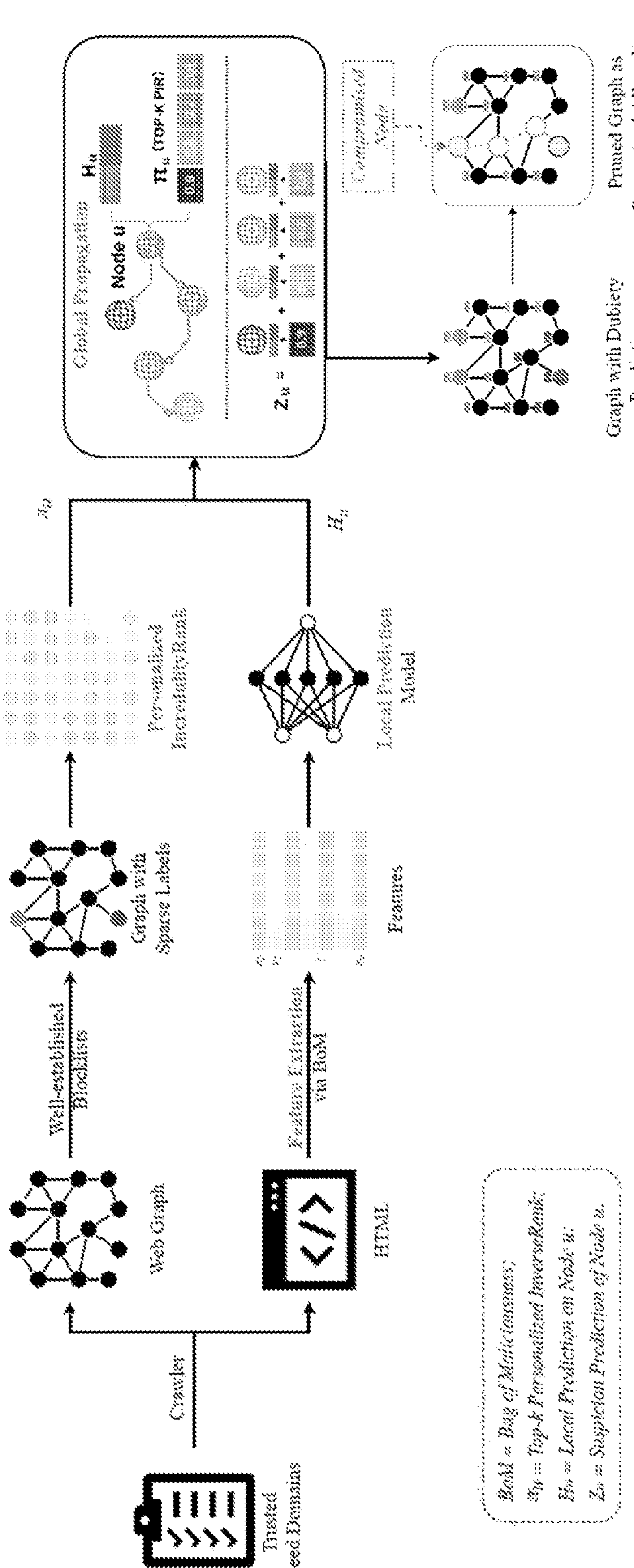
FIG. 4*a* illustrates an overall structure of the disclosed classification method.

FIG. 4*a* illustrates an overall structure of the disclosed solution. As can be seen, the model is constructed using websites on a greenlist as initial set of graph, and growing the graph organically by finding hyperlinked websites using a web crawler to find more nodes and the edges between those nodes. Using the HTML content of the nodes in the graph, features for each node are determined and correspond to a frequency of malicious words from the bag-of-maliciousness. The local prediction is obtained using a local prediction model, that may consist of a trained neural network that is commonly-shared by all the node in the graph. The local prediction model is trained via separate learning by decoupling prediction based only on the features and global propagation based on the PIR procedure, while using labelled domains to train the model. Local prediction and global propagation are used during inference to create a graph with trustworthy values. This graph can then be pruned by removing nodes that are labelled as untrustworthy, thereby creating a clean graph of trustworthy websites.

Figure 4B:
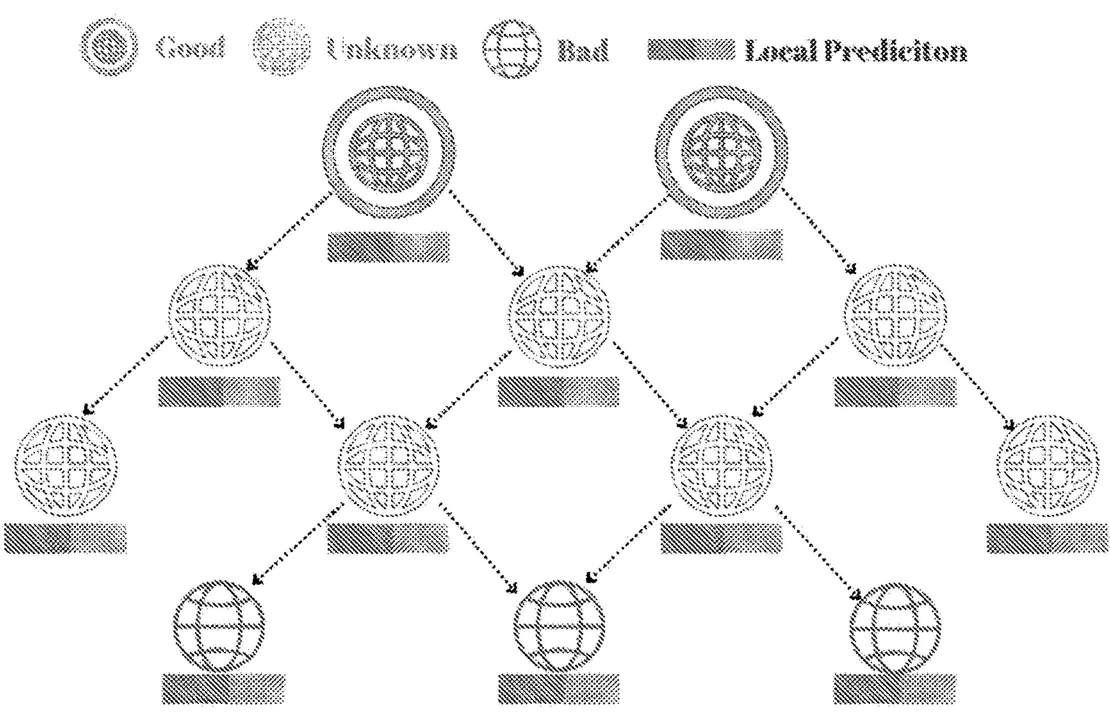
FIG. 4*b* illustrates a web domain name graph structure.
Figure 4C:
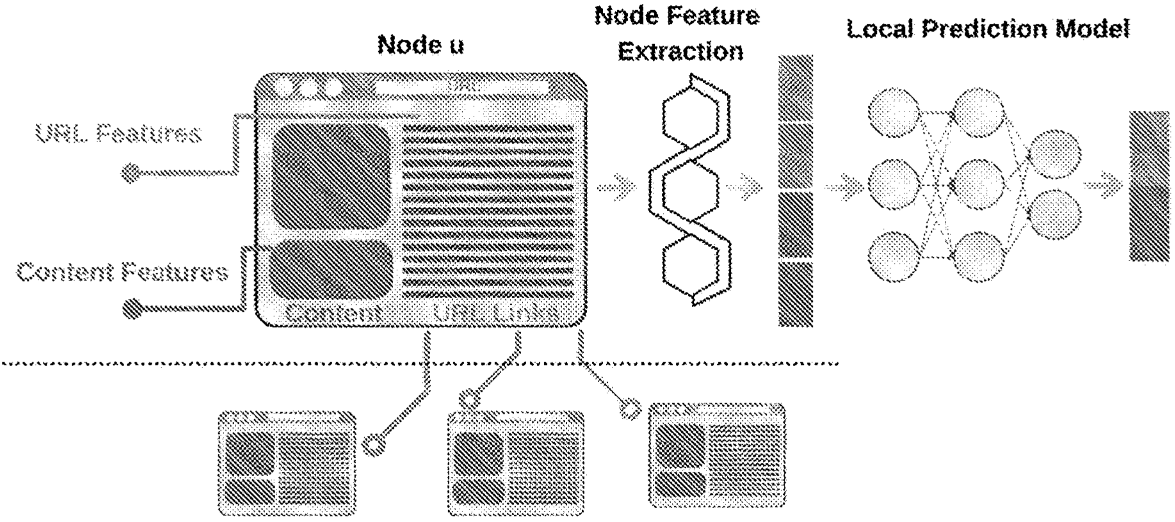
FIG. 4*c* illustrates a local prediction using a node's home page.

FIG. 4*b* illustrates a web domain name graph structure. This graph structure enables the local prediction model to be trained with only a small amount of labelled data. FIG. 4*c* illustrates a local prediction using a node's home page. It is noted that a domain is typically defined by a URL that may specify a particular server or IP address, such as www.google.com. For most domains, users visiting this domain are directed to a default home page, which is a publicly accessible file in HTML format. A local web browser then renders the file for the user. Often, this file is named "index.html". In this disclosure, when reference is made to a domain, this means default homepage of that domain, unless stated otherwise. In this sense, homepage (which is a website) is used interchangeably with domain. In that sense, it is irrelevant whether the method classifies a domain or a website (i.e. homepage).

The content features and the URL features of the homepages are used as input into the local predication model, which may comprise a neural network. There are two outputs of the local prediction model, corresponding to a values of trustworthiness and untrustworthiness. During global propagation, the PIR for the top-k neighbouring nodes are determined for each node in the graph, and PIR are used with the local prediction of the top-k neighbours to determine the final trustworthy prediction for the node.

The local prediction model produces multiple output values for each website in the selected one or more of the multiple neighbour websites, representing the top-k importance neighbours of the test website, and the test website, using the features of the website as input into the model. The multiple output values for each website in the selected one or more of the multiple neighbour websites and the test website is a representation of embedded features. In an example, the HTML content features from the websites are embedded into two output values for each websites, where one output value is representative of the trustworthiness and the other output value is representative of the untrustworthiness of the website.

In an embodiment, the local prediction model is a multilayer perceptron (MLP), a class of feedforward artificial neural network (ANN). However, other machine learning models, including other neural networks can also be used. The MLP consists of at least three layers of nodes: an input layer, a hidden layer and an output layer. Except for the input nodes, each node is a neuron that uses a nonlinear activation function. In some examples, the nonlinear activation function is a sigmoid function. If a multilayer perceptron has a linear activation function in all neurons, that is, a linear function that maps the weighted inputs to the output of each neuron, then linear algebra shows that any number of layers can be reduced to a two-layer input-output model. In MLPs some neurons use a nonlinear activation function that was developed to model the frequency of action potentials, or firing, of biological neurons.

Individual feature extraction of the web page content is an important step in distinguishing benign web pages from malicious web pages, transforming original data into features that can effectively describe the data. Therefore, the first step is to produce features relevant to malware, phishing, spamming and sexual information by extracting the content of web pages and URL-based features for each node in G.

The abundant information from URL and HTML may significantly increase the computation time and result in the "curse of dimensionality". Therefore, a flexible feature transformation is applied to obtain good features from the HTML and URL at the cost of a small amount of energy.

After the individual feature extraction, the numeric feature vector for each node is generated and local predictions are produced via neural network $f_\theta$ for each node based on its own features. Note that local prediction $H_i=f_\theta(x_i)$ acts on each node's features independently, allowing for parallelization and flexibility of local prediction approaches. With the numeric feature vectors, domain recognition can be considered as a binary classification task via a fully connected network (FCN) or other deep neural networks, consisting of multi hidden layers with ReLU activation functions. Given the labelled domain set, the parameters of local prediction FCN is trained with the Adam optimizer on cross-entropy loss.

The input of the local prediction model is the numerical feature vector using the Individual Feature Extraction component on the HTML and URL. The local prediction model could be divided into two parts: the last layer (SoftMax layer, output label, input feature embedding E) and rest preceding layer (input feature vector, output feature embedding E).

During the global propagation, a message passing scheme such as the PageRank (PR) or PPR procedure can be used to find trust neighbours from each node in the whole graph vision instead of a limited two-hops vision of existing graph neural networks. The advantage of the such procedure enables even infinitely many neighbourhood aggregation layers effectively. Inspired by trust behaviour in society, IncredulityRank is proposed, as a new variant of PPR specified for the trustworthiness evaluation on the web. As PPR is hard to be calculated for a large graph, the top-k approximation mechanism is applied to achieve an efficient and fast PPR approximation for a large graph in the website domain trust scenario. The PIR approximation may be viewed as a pre-processing that operates prior to or in parallel with the local predictor training.

The final prediction for node s (as denoted by $Z_s$) is aggregated with its local prediction and the predictions propagated from its top-k important neighbours $N^k(s)$ associated with importance score $\pi(s, v_i)$ via the personalized Incredulity Rank approximation scheme, denoted by $$Z_s = \text{softmax}\left(\sum_{j \in N^k(s)} \pi(s, v_j) H_j\right) \tag{2}$$

Here, $H_j$ is the local prediction probability vector for node j. From Equation 2, determining the final prediction can be considered as aggregating corresponding output values $H_j$ from the local prediction model by calculating a weighted sum of corresponding output values with the PIR $\pi$ of the top-k important neighbours. By using the SoftMax function on the weighted sum, as shown in Equation 2, aggregating the corresponding output values can be considered as converting the output values into a probability distribution, that is, both values add to '1'.

Given node i, the information to be aggregated is between its local feature embedding $E_i$ (i.e. "output values") and that of its important neighbours (first average important neighbours' feature embeddings based on the trust weight, denoted by $E_{nb}$, then the final feature embedding for the node is $E_{final}=(E_i+E_{nb})/2$). Then input the averaged feature embedding $E_{final}$ to the SoftMax layer to obtain the final prediction.

For the training, the gradient flows along with the PIR-based propagation procedure during backpropagation, which significantly increases the model's accuracy due to implicitly considering infinitely many neighbourhood aggregation layers.

There are three options to apply the PIR-based global propagation for the node classification. (1) Training Incorporation: The PIR-based is only implemented during training the local neural network for prediction, however during inference, only the logits from the local $f_\theta$ is used to predict the node labels; (2) Inference Incorporation: the local neural network $f_\theta$ is trained without considering information from any neighbours and on the local node feature only. During the inference, the prediction of a given node is aggregated by its neighbours' logits derived from the pre-trained $f_\theta$ networks with fixed weights, according to its PIR vector; and (3) End-to-end Incorporation: implemented for both Training and Inference.

For the Training Incorporation, Power Iteration based or top-k PIR methods for this model can be applied to figure out the PIR for each node of the given graph. For the Inference Incorporation, the top-k PIR provides an efficient and fast estimation to aggregate the neighbours' information from a wide range to improve the prediction of a given node. In this model, the End-to-end incorporation is applied, i.e. apply the PIR-based propagation during training and inference.

In addition, for some use cases, the propagation may not be available, and therefore the strategy is evaluated without propagation applied in neither training nor inference (Without Incorporation (WI)). After evaluation on these strategies, two possible implementations are exploited: static inference and real-time inference (even without global propagation). End-to-end Incorporation is applied as the default strategy in the disclosed method, i.e., the PIR-based propagation during training and inference.

Training the neural network of the local prediction model involves calculating a classification value for each node on the graph and minimising a cost between the classification value and node labels obtained from a whitelist and/or blacklist. From the graph structure, only a small amount of labels are required as the topology of the graph makes up for the small number of labels. Training the neural network of the local prediction model can thereby be considered as semi-supervised learning, as only the small fraction of labelled samples are used to update the parameters during training, and during the inference, the rest of unlabelled samples is labelled used the trained model.

The output is the label associated with the trustworthiness value in the range of [0,1]. The extensive white/black lists could be obtained via pruning nodes of the graph according to the label or threshold of the trustworthiness value. Additionally, pruning strategies may be used to achieve almost 100% clean results. The graph is thereby pruned based on the classification of each node after calculating a classification value for each node in the graph and classifying each node on the graph based on its classification value.

The input of the training is the entire graph including a small number of labelled nodes. The entire graph consists of all nodes (with/without labels). A small number of nodes have labels (0: benign and 1: malicious), while others have no labels (−1: unknown). Only nodes with 0 or 1 labels may be used for training (update the parameter of the model using cross entropy), and nodes with −1 may be overwritten with labels (0/1) using the trained model during inference.

First, the parameters of the local prediction model (e.g. of the MLP) are shared among all nodes. Second, during the training, only the nodes with (0/1) labels are used to update the parameters of local prediction model. As the fraction of the nodes with 0/1 labels is very small (labels here are given by user according to the whitelists/blacklists), this is the reason why the training could be fast. Third, the signal used to update parameters of local prediction model is calculated on the cross entropy between the predicted label (0/1) and the ground truth label (0/1), instead of whitelists/blacklists.

The method may use a two-step training. Step 1: for a given node i, PIR may figure out the trust score between this node i and every node j from the rest (also used as the weight score for the edge defined by w(i,j)), then select its top-k important neighbours according to the trust score. Step 2: given a node with 0/1 label, the input of the local prediction model is its feature vector and the averaged feature vectors of its top-k important neighbours in terms of the weight. Then update the parameter of the local prediction model according to the predicted label and the ground truth label.

The output of the disclosed method is the prediction of suspicion value (or trustworthiness) of each node, which indicates the compromise intent. Extensive allow/deny-lists could be obtained via pruning nodes of the graph according to the threshold of the suspicion value. Additionally, two pruning strategies are provided to further achieve a clean extended allow-list with compromised nodes pruned.

Individual Feature Extraction

The first step is to extract individual features relevant to malware, phishing, spamming and sexual information by extracting the statistic and lexical features from the content of web pages (HTML) and URLs.

Statistic feature of HTML and URLs

The first type of individual features are the statistic features in terms of the HTML tags and URLs. Dynamic webpage development are main sources to inject malicious code into web pages. Therefore, statistical properties in the web page content can be used to detect web pages which are malicious, such as number of HTML tags, iframes, scripts tags, href tags etc. These tags may be the sources to inject external code or for phishing the website by redirecting to malicious server. The statistic URL features for each domain are also considered, such as URL Length, number of special characters (dots '.', hyphens '-', forward slashes '/', underscores '_', equal signs '=', etc.) in URL and presence of IP Address in URL, and the maliciousness values of the domain/average maliciousness value and number of URLs in the HTML derived from a pre-trained CNN-LSTM-based binary classifier.

Lexical Feature Based on HTML Text

The content of the HTML of the domain's homepage is also considered. The key point is to use a numeric representation (e.g., a vectorisation) for the textual content. The textual content of a web page is often large, which is hard to process by deep neural network-based embedding. Therefore, a flexible representation mechanism is adopted, inspired by the idea of bag-of-words (BoW).

Figure 5:
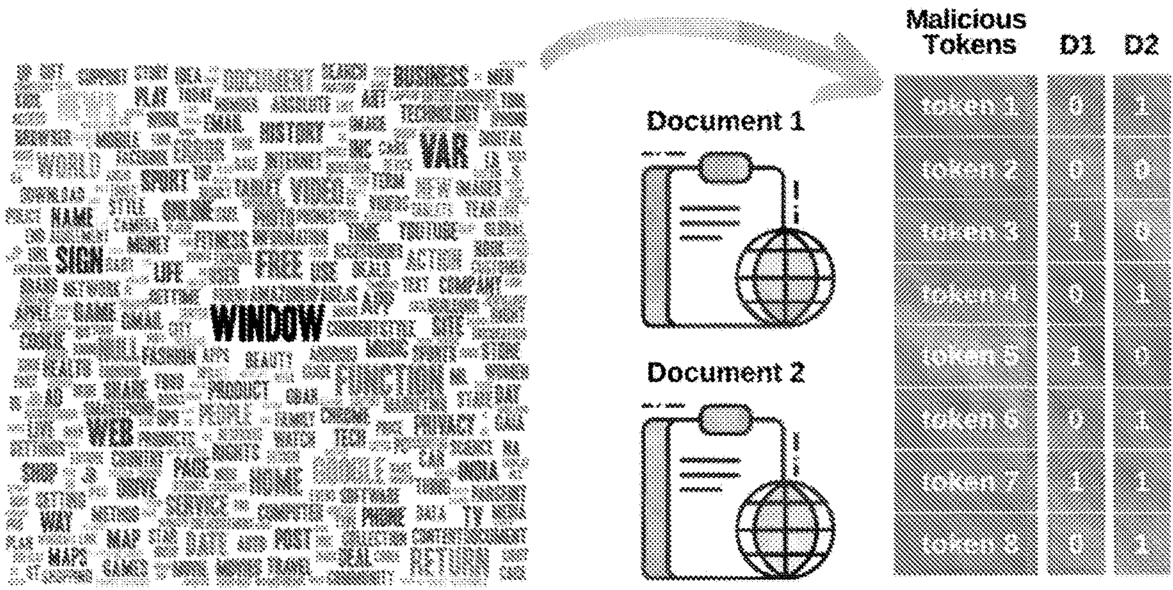
FIG. 5 illustrates a malicious dictionary and the bag-of-maliciousness.

FIG. 5 illustrates a malicious dictionary and the bag-of-maliciousness. Determining features related to content for input into the local prediction model comprises determining a frequency of words used in the content from a dictionary of words. First, a token dictionary is built that consists of malicious words or symbols summarized from a set of malicious web pages. Then, a collection of HTML contents is converted to a matrix, where each document is a row and each token from the malicious dictionary being the column, and the corresponding (row, column) values being the frequency of occurrence of each token in that HTML document. Namely, each malicious token is a column name, with the corresponding value being the frequency of that word in the document. The numerical representation is given the name: bag-of-maliciousness (BOM). Each word is treated individually, and the order in which the words occur does not matter. Using the BoM, the set of textual content of each HTML is converted to a frequency distribution matrix, where each HTML document is a row, each token from the denied dictionary is the column, and the corresponding (row, column) values is the frequency of occurrence of each token in that HTML document. Namely, each denied token is a column name, with the corresponding value being the frequency of that word in the document. Each token may be treated individually, regardless of the order of words.

IncredulityRank

Importance values between the test website and multiple neighbour websites are calculated and are used to select one or more multiple neighbour websites to perform the aggregation of corresponding output values from the local prediction model. These importance values can be considered to be representative of how important or relevant a neighbour website is to the test website, based on the hyperlinks going to and from each website. PPR may be used to determine the importance value between the test website and multiple neighbour website. PageRank is a measure of how important or relevant a website is on the whole graph, while PPR is a measure of how important or relevant a website is in comparison to another website.

PageRank or PPR do not consider any knowledge about the quality of a domain, nor explicitly punish badness, resulting in some malicious domains produced by a skilled adversary gets a high PageRank score.

In practice, PageRank can be manipulated, e.g., websites with low-quality content could still achieve a high PageRank through link exchange. Therefore, as the interplay of multiple factors relevant to the respectability and credibility of a website, domain trust is hard to be evaluated by PageRank and PPR.

TrustRank provides a biased PageRank, based on the assumption that good sites rarely have links to bad sites. However, TrustRank can also be manipulated via creating outbound links to high-ranking, reputable websites or secure backlinks from high-ranking, reputable websites. Besides, totally "good" websites are always hard to define and find, while totally "bad" websites are easier to be recognized.

In this disclosure, distrust is propagated backward on the web. Phishing, spamming, or compromising behaviours aim to provide untrustworthy recommendations for end-users.

The recognized untrustworthy recommendation provides an indicator to review the trustworthiness of the recommender. The untrustworthy recommenders are those who strongly support an untrustworthy recommendation. Therefore, given the detected untrustworthy recommendation, it is feasible to find the recommender who strongly supports the recommendation after a few iterations of distrust backward propagations. Additionally, it is more feasible to recognize a web page that is suspicious than completely trusted.

The IncredulityRank disclosed herein is an algorithm for automatically evaluating malicious behaviours propagandistic networks. Namely, the algorithm quantitatively evaluates the untrustworthy web neighbourhoods for a given node automatically.

Formally, a breadth-first-search is performed over the incoming links from each domain detected as malicious (untrusted) (e.g., each denied node in the crawled domain graph, associated with the suspicion score of 1) via an automatic tool like google safe browsing API. Each node d in the graph is assigned an IncredulityRank distrust score equal to the sum of its children's trust scores $\{c_1, c_2, \ldots, c_n\}$ and multiplied by a discount factor $\gamma$. The IncredulityRank trust score for each node is then defined as one minus its assigned distrust score. Nodes that could be defined as totally distrusted have a fixed IncredulityRank distrust score of 1.

$$IR(p)^{distrust} = \gamma \times \sum_{i \in N_{outlinks}(p)} IR(c_i)^{distrust} \quad (3)$$

$$IR(p)^{trust} = 1 - IR(p)^{distrust}$$

In an example, processor 301 performs a breadth-first-search over the incoming links from each domain detected as malicious or denied (distrust seeds) via an automatic tool like google safe browsing API, associated with the distrust value 1. Then, the processor 301 inversely splits the distrust value among the in-neighbours that link to a given distrust seed equally, layer by layer. That is, if some pages have outlinks to the malicious pages, then it is likely that these pages are also malicious. The further away they are from malicious seed pages, the less certain it is that a page is malicious. Only incoming links to malicious nodes are considered, as the algorithm aims to trace paths to each flagged malicious node. Outgoing links from suspicious nodes may lead to legitimate domains, so the algorithm avoids penalizing good domains with unreciprocated incoming links from bad domains.

Formally, if page p has an distrust score of $c_p$ and it has in(p) incoming pages, each of the incoming pages will receive a score fraction $c_p$/in(p) from p. The actual IncredulityRank distrust score of a page will be the sum of the score fractions received through its outlinks and multiplied by a discount factor $\gamma$. Processor 301 then normalizes summed scores to the standard range of [0,1].

The more distrust score a page accumulates from some other pages, the more probable that it is malicious. The IncredulityRank trust score IR(p) for a node p is then defined as one minus its accumulated distrust score.

A less restrictive attenuation strategy is applied as a simple discount function to split and dampen the distrust (suspicion) score the further it gets from the detected node. The IncredulityRank takes an inverse approach to distrust attenuation by starting from the flagged nodes and splitting and dampening distrust upwards through the tree.

The algorithm penalizes domain nodes that lead to detected malicious domains by reducing their distrust score proportional to how many steps they are from a detected domain and the number of flagged domains they lead to. Only incoming links to nodes are considered as the algorithm aims to trace paths to each flagged node. Outgoing links from suspicious nodes may lead to legitimate domains, so the algorithm avoids penalizing good domains with unreciprocated incoming links from bad domains.

Approximation of IncredulityRank

As PPR is hard to be calculated for a large graph, this section aims to approximate the Personalized IncredulityRank in an efficient manner. At the beginning of the approximation, the initial PIR values are calculated using refined Equation 3 above instead of the uniform distribution of other approaches. For an inversed web graph G=(V,E), the propagation procedure uses the Personalised IncredulityRank matrix PIR $\Pi$, in which the u-th row is the PIR vector of the given node u, denoted by $\pi(u)$. Each entry (u,v) of the matrix $\Pi$, measures its relevance of a node v from the perspective of source u. The global IncredulityRank of a vertex v can be viewed as the sum of the contributions from all other vertices, i.e., the sum of the v-th column of the matrix $\Pi$. The v-th column of the matrix $\Pi$ is also called the contribution vector of v.

In some examples, to initialize trust values, the existing approaches equally distribute the initial trust values among trusted seed nodes, or distrust values among denied nodes, e.g., 1 divided by the number of trusted or denied nodes. However, the initial seeds or denied nodes are rare and sparse, which may lead to hard-to-converge issues and low quality of trustworthy evaluation performance. In other examples, all suspicious paths (shortest only) are first found and identified in the graph from seeds to denied nodes in the crawled domain graph, followed by initializing the PIR values along the suspicious paths according to Equation 3. Based on the adaptive initialization, the non-zero initialized value is then expanded from 178 (0.01% of all nodes) in existing methods to 283,117 (16% of all nodes) in the crawled domain graph using the extended from the same 178 flagged nodes. This fraction could increase when considering more denied nodes. This initialization strategy enhances the scale of initialized values with reasonable values towards fast convergence and high quality of the suspicion evaluation.

The query in the PIR-based propagation procedure could be considered as Single-source queries for the PPR value of every node w.r.t. a given node s, or Top-k queries for the largest k nodes whose PPR w.r.t. the given node s. Furthermore, for a given strongly connected graph, the PPR matrix is non-zero for all nodes, resulting in considerable computing and storage burden. Therefore, a selection mechanism is applied to produce a more efficient approximation via selecting top k most elements of the PPR matrix and truncating the rest to zero. Here, Top-k queries is applied to construct the PIR vector for each node, i.e., only the set of nodes with top k largest PIR scores according to $\pi(u)$ w.r.t. a given node s for its information propagation are considered. Formally, given a source node s, desired estimation amount k, a PIR threshold $\delta$, an estimation error bound $\eth$ and a failure probability $p_f$, the approximate top-k PIR query outcomes a set of k nodes $v_1, \ldots, v_i, \ldots, v_k$ for a node s, with their estimated PIR $\hat{\pi}(s, v_i)$. The PIR threshold δ is considered to be an importance threshold, for which multiple neighbour websites are selected to obtain the top-k important neighbours. It is satisfied the following conditions at probability $1-p_f$ for any $i \in [1,k]$:

$$|\hat{\pi}(s, v_i) - \pi(s, v_i)| \leq \grave{o}\pi(s, v_i) \tag{4}$$

$$\pi(s, v_i) \geq (1 - \grave{o})\pi(s, v_i^*)$$

$$\pi(s, v_i^*) \geq \delta$$

Here, $\pi(s, v_i^*)$ is the actual i-th largest PIR node, and δ is assumed at O(1/n). The first condition guarantees the accuracy of the estimated POR values, and the second one ensures that the i-th estimated node has a PIR close to the actual i-th largest PPR.

Some PPR-based propagation schemes suffer from three major challenges: (i) Overheads. Calculation of PPR on a large graph requires the immense computational cost of space and time. In addition, the complexity of the PPR search problem is $O(n^2)$ for storage and O(|T|) for time, which is infeasible for a large graph. (ii) Top-k Precision. The precision of top-k PPR commonly lacks a precision guarantee, degrading the quality of trust evaluation by a huge false positive ratio. (iii) Dynamics. Considerable pre-computation on the input graph is commonly required, hampering the application to graphs with frequent updates.

The disclosed algorithm aims to provide the fast top-k PIR query with no less than ρ portion of the returned outcomes are among the real top-k values at least 1−1/n probability. In one example, this top-k PIR estimation is achieved in two stages: possible candidate set rough estimation and top-k refinement. In the first stage, every node may be evaluated for the rough PIR value, resulting in a possible candidate set PC. Secondly, the PIR value of each node from PC may be refined iteratively towards high confidence to confirm the top-k candidates.

The key point here is to balance the trade-off between the accuracy of estimation and computation cost for both stages. The candidate set is maintained and updated via iteratively conducting Forward Push, Monte-Carlo, and Backward Search, until the candidate set satisfies the precision requirements with high confidence. Specifically, given a graph G, a source node s, α,k, and a precision parameter ρ, the top-k PIR algorithm returns the top-k node set of s and associated with their PIR values at ρ precision. The nodes set V is divided into three sets: T for top-k nodes with nodes to be confident as top-k by algorithm, PC possible candidate set with nodes to be hard to decide with current confidence bounds, and NT with nodes to be confident as non-top-k by the algorithm. At start, T=∅, PC=NT.

Forward Push (FP) is also proposed to approximate the PIR scores $\hat{\pi}(s,v)$. With respect to a source node s, every node v is associated with two values: reserve value $\hat{\pi}(s,v)$ and residue value r(s,v). The reserve is the rough estimation of PIR for s, indicating the calculated probability that a random wander starting from s stops at v. The residue is the probability that a unprocessed random walk starting from s to v. Initially, the reserve and residue of all nodes are 0, except for r(s,s) which is set to the initialized PIR from the initialization step.

Given a global residual threshold $r_{max}$, the FP iteratively pushes the residues of all nodes with $$\frac{r(s, v)}{d_{out}(v)} > r_{max}$$

(frontiers) to their reserves and the residues of their out-neighbours, where $d_{out}(v)$ is the number of outgoing neighbours of v. A node s can be considered an active node when the conidtion $$\frac{r(s, v)}{d_{out}(v)} > r_{max}$$

is met. Specifically, for each node u in the set of out-neighbours of v, denoted by $N_{out}(v)$, the residue is updated via $$r(s, u) = r(s, u) + (1 - \alpha)\frac{r(s, v)}{d_{out}(v)}. \tag{5}$$

and the reserve value of v is updated via $$\tilde{\pi}(s, v) = \tilde{\pi}(s, v) + \alpha r(s, v), \tag{6}$$

followed by resetting the residue of v to 0, until no node to push. Finally, the $\tilde{\pi}(s,v)$ is used to estimate the π(s,v), with time complexity $O(1/r_{max})$ but without guarantee.

Calculating the importance values between the test website and the multiple neighbour websites can be considered as propagating a parameter related to the importance value between the test website and the multiple neighbour websites to calculate, for each of the multiple neighbour websites, the importance value based on the parameter. In this example, the parameter is the residue defined above. Propagating the parameter is performed using the FP procedure, where a node, representing a website, is considered as active by satisfying an activation condition and propagated to its out-going neighbours. The activation condition is based on the parameter calculated for that one of the multiple neighbour websites. As an example, the activation condition is $$\frac{r(s, v)}{d_{out}(v)} > r_{max}.$$

Determining the out-going neighbour website to continue the parameter propagation may be considered to be selecting one of the multiple neighbour websites based on the parameter calculated for that one of the multiple neighbour websites and propagating the parameter from that selected one of the multiple neighbour websites.

After selecting one of the multiple neighbour websites based on the parameter calculated for that one of the multiple neighbour websites and propagating the parameter from that selected one of the multiple neighbour websites, the parameter is set to a predefined value after propagating the parameter, to indicate that the selected one of the multiple neighbour websites has been processed. As an example, after propagating the parameter from one node to after, the parameter corresponding to the node before propagation is set to zero. As an example, setting the parameter to zero after the push operation indicates that the node has been processed or visited during the FP procedure.

At the end of this process, the importance value is updated by adding the parameter multiplied by a weight factor. As an example, the weight factor is the constant α. The propagation of the parameter terminates when no node satisfies the activation condition, in response to the parameter for the multiple neighbour websites being below a termination threshold. As an example, the FP procedure terminates when the condition $$\frac{r(s, v)}{d_{out}(v)} > r_{max}$$

is not met by any nodes.

Figure 6:
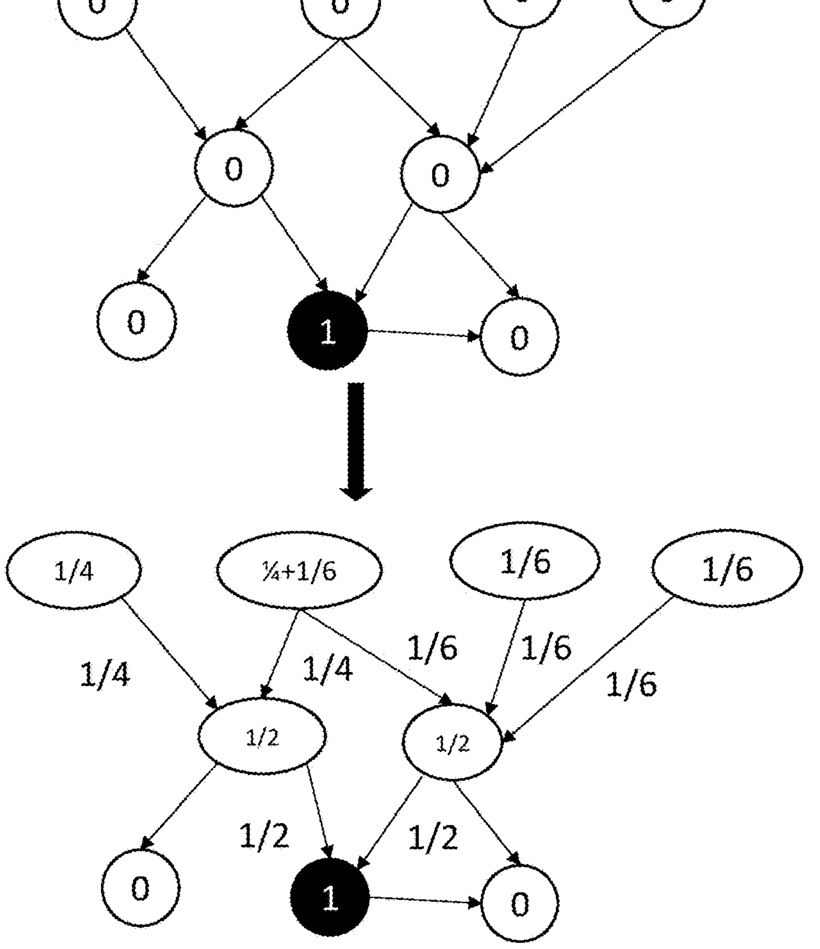
FIG. 6 illustrates a worked example of the initialisation mechanism of the Personalised IncredulityRank (PIR) procedure.

FIG. 6 illustrates a worked example of the initialisation mechanism of the PIR procedure. The initial value of the parameter before propagation is determined using an initialisation procedure. Before FP occurs in the PIR procedure, the nodes undergo an initialisation step, where the untrustworthy values of the nodes are inversely split equally. For example, if a node with an initial untrustworthy value of 1 (an untrustworthy value of 1 represents a malicious node) has two parents both with an untrustworthy value of 0, then during the initialisation step, both parents will acquire an untrustworthy score of 1/2.

Therefore, initialising the parameter can be considered to be dividing the parameter of a first website among websites that link to the first website. Then before propagating the parameter using the FP procedure, initially the reserve and residue of all nodes are 0, except for r(s,s) which is set to the untrustworthy value of the corresponding node from the initialization step. The parameter related to the importance value between the test website and the multiple neighbour websites is therefore based on whether the test website links to a malicious website. This is so because the parameter is penalised if there is a link to an untrusted or malicious website.

Figure 7:
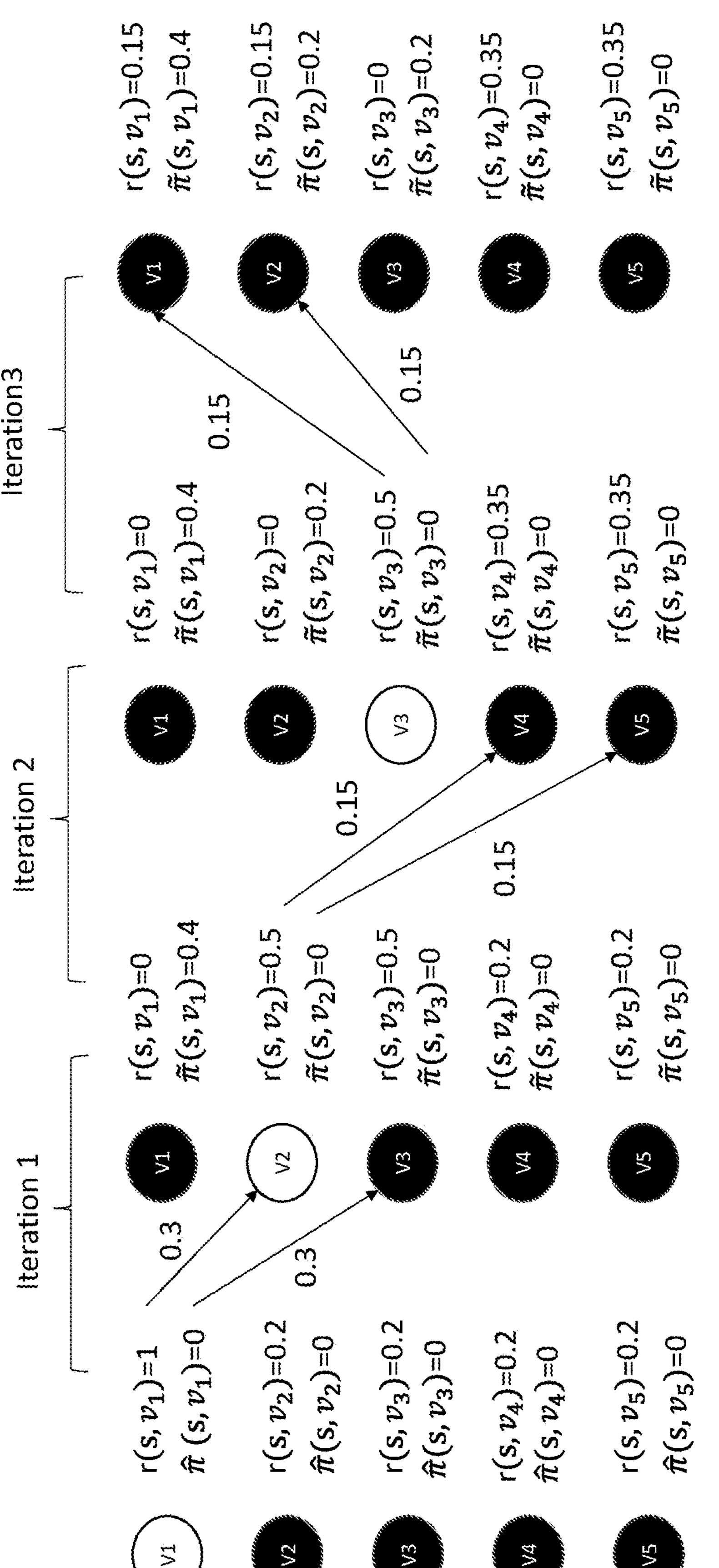
FIG. 7 illustrates a worked example of the Forward Push procedure.

FIG. 7 illustrates a worked example of the FP procedure. In this example, $s=v_1$, $r_{max}=0.2$, $\alpha=0.4$. At the beginning, only $v_1$ is active; thus it is picked to perform a push operation, in which $\hat{\pi}(s,v_1)=\alpha 1=0.4$ and the residues of $v_1$'s neighbours $v_2$ and $v_3$ are increased by $(1-\alpha)*1/2=0.3$, respectively. After this push operation on $v_1$, both v2 and v3 are now active. The algorithm picks one of them arbitrarily; in this example, v2 is picked. After the push operation on v2, $\hat{\pi}(s,v_2)=0.5*0.4=0.2$ and each of its neighbours, i.e., v5 and v4, has residue increased by 0.6*0.5/2=0.15. Next, v3 becomes the only active node; After the push operation on v3, no node is active and thus the algorithm terminates. This example is used to illustrate the FP procedure and does not define the values $r_{max}$ and α.

After termination of the propagation of the parameter using the FP procedure, the importance values are further calculated by performing random walks from a starting website. The starting website is selected from the test website and the multiple neighbour websites, based on the parameter after terminating the propagating, to update the importance value of the starting website. Selecting from the test website and the multiple neighbour websites involves determining the websites in which the parameter (i.e. the residue in the FP procedure) is non-zero. As an example, these random walks from a starting website are performed using a Monte-Carlo (MC) method. MC is a solution for PPR estimation. MC generates rw(s) random walks from source node s. For each node v, there are rw(s,v) random walks stopping at v. MC has guarantees on the approximate solution, with the cost of the efficiency.

In the first stage, FP and random walks are used to produce a rough estimation of PIR values for each node, using the outcomes residue values r and reverse values $\tilde{\pi}$. The number of random walks are set as $n_{rw}=4\sqrt{m\times n\times \log n}$ and $$r_{max} = \frac{4}{\sqrt{m \times n \times \log n}},$$

such that the estimation error is at most π(s,v)/4 for any π(s,v)>1/n with probability 1−1/n. Then, FP, MC and group backward search are iteratively conducted to refine PC and build T, with $n_{rw}=n\times \log n/|PC|$, $$r_{max} = 1/m,\ r^b_{max} = 1/\sqrt{m}.$$

In each iteration, the group backward search and FP are conducted at first to build the backward residue vector $r^b$ and backward reserve vector $\pi^b$ using PC set and threshold $$r^b_{max},$$

as well as the forward residue vector r and forward reserve vector $\hat{\pi}$ using PC set and threshold $r_{max}$.

Next, random walk sampling-based mechanism is performed to update the PC set and T set, until the count of T is more than ρk. If |T|<ρk, the may be $$r_{max},\ r^b_{max}$$

may be halved, and the number of random walks may be doubled. As a result, an adaptive top-k PIR estimation algorithm is implemented. In some examples, FP may be computationally too expensive to obtain exact estimation, which can be stopped earlier. But the tail term cannot guarantee an approximate quality. MC can guarantee that good approximate quality is obtained, but the efficiency is low. This top-k PIR estimation combines these two stages: FP from source node s with early termination at first, and then random walks to improve the accuracy of approximation for the nodes with non-zero residues. In some examples, at beginning of the approximation, the initial PIR values are calculated using Equation 3 instead of the uniform distribution.

Formally, the estimation of PIR is given as $$\hat{\pi}(s, t) = \tilde{\pi}(s, t) + \sum_{v\in V} r(s, v)\pi'(v, t) \tag{7}$$

where $\tilde{\pi}(s,v)$ and r(s,v) are from FP, and π'(s,v) is from MC. Specifically, given G,s,α, and a residue threshold $r_{max}$, FP is conducted at first to obtain $\tilde{\pi}(s,v)$ and r(s,v) for each node v∈V.

Next, for every node $v_i$ whose residue is larger than zero, conduct $rw_i=r(s,v_i)\times rw/r_{sum}$ random walks from it. The number of random walks rw from each node is decided via $$rw = d_{out} \times r_{sum} \times \frac{(2ò/3+2)\times\log(2/p_f)}{ò^2 \times \delta}, \tag{8}$$

$$r_{sum} = \sum_{v_i \in V} r(s, v_i)$$

where $r_{sum}$ is the sum of residue for all nodes. When a random walk terminates at a node t, then the $\pi'(v,t)$ grows by $$\left(\frac{r(s,t)}{r_{sum}} \times \frac{rw}{rw_i}\right) \times \frac{r_{sum}}{rw}.$$

For the random walk, $\alpha$ part of them is expected to stop at the current node, and the portion of such random walks within O(1) time can be immediately recorded, which avoids exactly simulating these random walks. Therefore, the estimation of PPR is renewed as $$\hat{\pi}(s,t) = \hat{\pi}(s,t) + \alpha \times r(s,t) + \sum_{v \in V} r'(s,v)\pi''(v,t) \tag{9}$$

Here $$X_t^v$$

and $$X_t^v$$

is defined as: when sampling a random walk from each node v, one of its out-neighbour u may be randomly chosen, followed by conducting a random walk from u.

$$X_t^v = 1$$

means the random walk terminates at t and otherwise $$X_t^v = 0.$$

consequently, The $r'(s,v_i)=(1-\alpha)r(s,v_i)$ and $rw_i=r(s,v_i)(1-\alpha)\times rw/r_{sum}$.

The top-k PIR estimation is a two-stage process. In the Stage I, the aforementioned procedure is performed using $\delta=1/(k\times 2^{i-1})$, $ò'=ò/2$ and $p'_f=p_f/(n\log_2(n/k))$ for at most $\log_2(n/k)$ iterations, where i is the i-th iteration. In the Stage II, the top-k PIR estimated value for each node is selected and the accuracy is assessed via evaluating whether k-th estimation $\hat{\pi}(s, v_k)\geq(1+ò)\times\delta$. If the accuracy of the top-k estimation is not satisfied, the iteration is continued with the halved value of $\delta$.

The global residue threshold $r_{max}$ may be set at $$\frac{ò}{\sqrt{m}}\sqrt{\frac{\delta}{(2ò/3+2)\log(2/p_f)}},$$

and $\delta$ setting at 1/n.

To further improve the efficiency and scalability of PIR estimation, an adaptive residue threshold strategy can be applied to maintains an individual $r_{max}(v_i)$ for each node in V, instead of the common threshold for all nodes. Specifically, the output PIR values from Stage I are used to estimate the global PageRank, denoted by pr(u), as a measurement of the global importance of a node u with respect to the whole graph. Generally, node u with larger pr(u) tends to accumulate higher residue, then the adaptive $r_{max}(\bullet)$ strategies may be applied. Initially, the $$r_{max}^0(v) = r_{max},$$

$\nabla v\in V$ for Stage I, and the nodes are then ordered based on the estimated $pr(u)/d_{out}(u)$, and decide the individual $r_{max}(u)$ as follows.

$$r_{max}(u) = r_{max} \cdot \frac{a \cdot \delta_{min} \cdot \lceil d_{out}(u) \cdot r_{max} \cdot \psi / \delta_{min} \rceil - \delta_{min}}{d_{out}(u) \cdot r_{max} \cdot \psi} \tag{10}$$

Here $\delta_{min}$ is the pre-computation setting for $\delta$ (setting at 1/n) and $$\psi = \frac{(2ò/3+2)\log(2n\log n/p_f)}{ò^2}.$$

In another example, this top-k PIR estimation combines four stages:

I. Forward Push for coarse estimation. Forward Push from a source node s is conducted to obtain coarse estimations for the first stage of one iteration using adaptive initialization and with early termination.

II. Random walks for refining estimation. Random walks is used to refine the accuracy of approximation for the nodes with non-zero residues for the final stage of one iteration.

III. Top-k PIR values selection. Top-k PIR selection is applied to early terminate the iterations of estimation when satisfying the accuracy criteria of estimation.

IV. Adaptive threshold for efficiency and scalability. To further improve the efficiency and scalability of PIR estimation, an adaptive residue threshold strategy will be applied to maintain an individual residue threshold for each node $v_i\in V$, denoted by $$r_{max}^{v_i},$$

instead of the common threshold for all nodes.

Incorporation Strategies of Global Propagation and Real-time Inference

Real-time and efficient inference is important for practical applications, especially for the dynamic scenario. Ideally, the model is trained once while providing continuous inference after implementation. Therefore, the impact of PIR-based propagation on the performance of the node classification is evaluated according to four strategies in Table 1. In particular, this involves comparing the accuracy of the classification using Training Incorporation (TI), Inference Incorporation (II), and End-to-end incorporation (EI) and without addition (WO), to investigate the significance of the PIR-based propagation. Without propagation, each node is treated independently and the local prediction neural network is trained using only the node feature. The results are demonstrated later in the result section, as well as in FIG. 8, which inspires real-time inference pipeline.

Figure 8:
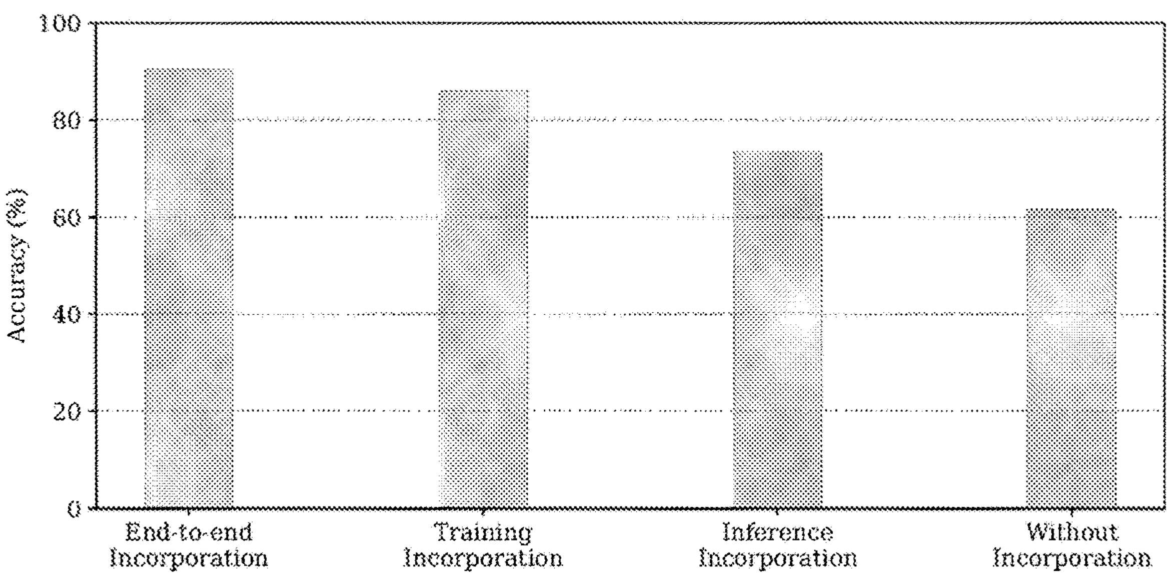
FIG. 8 illustrates the performance of Training Incorporation (TI), Inference Incorporation (II), and End-to-end incorporation (EI) and Without Incorporation (WI).

FIG. 8 illustrates the performance of Training Incorporation (TI), Inference Incorporation (II), and End-to-end incorporation (EI) and Without Incorporation (WI). In other words, FIG. 8 illustrates accuracy for different propagation strategies. As can be seen, the method with End-to-End achieves the best accuracy compared to other mechanisms. It enhances the accuracy by almost 20%, compared to without the addition of propagation component.

Note that Training Incorporation improves the accuracy by 10% compared to the without propagation case. Further, even for the Inference Incorporation, the accuracy increases by 4% compared to without propagation case, little degradation slightly compared with End-to-End case. Additionally, the training time and complexity would also be reduced by removing the propagation during training. Therefore, it is feasible to consolidate this method to pre-trained classifiers that consider no neighbours' information, achieving notable accuracy enhancement.

Figure 9:
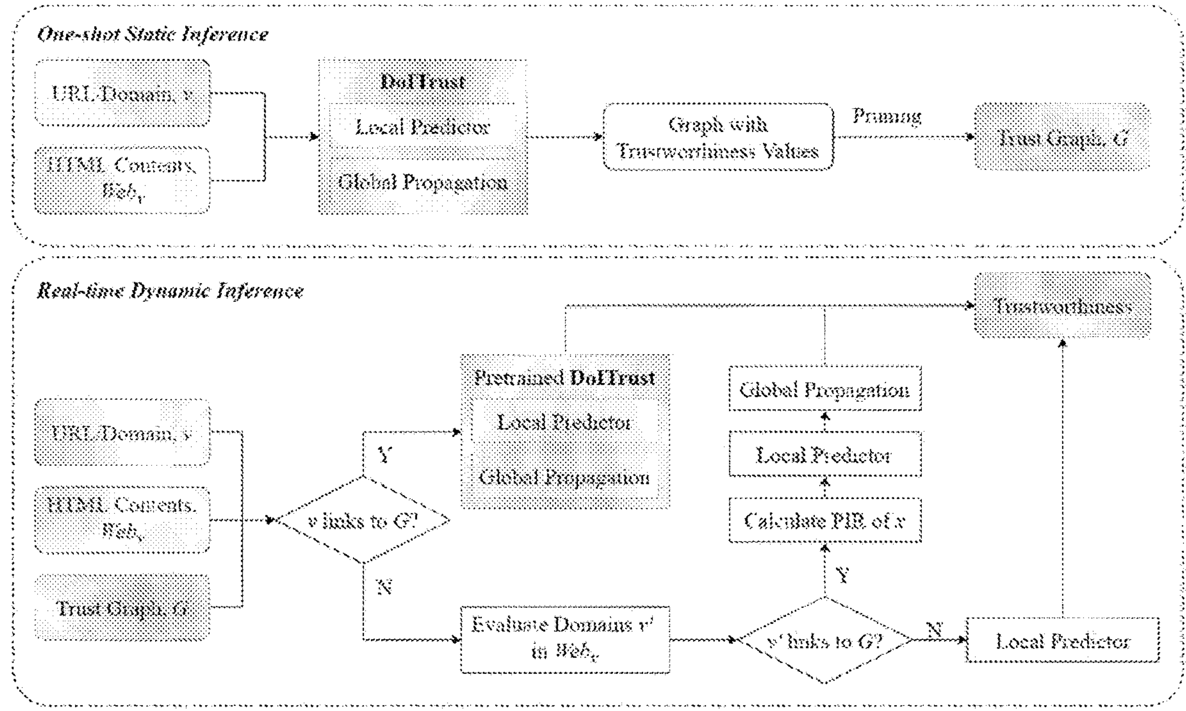
FIG. 9 illustrates the process of one-shot static inference and real-time inference.

FIG. 9 illustrates the process of one-shot static inference and real-time inference. (1) One-shot static inference. Given the website domain graph G associated with feature vectors as the input, this case aims to learn the semi-supervised node classification model using only a small fraction of nodes of G to be labelled. After the training with Training Incorporation (TI) strategy, the outputs are common local classifier, and prediction of these unlabelled nodes of G, as well as G': Trustworthy version of G by pruning predicted malicious nodes via pruning. Here G' could be used as extensive whitelist and blacklist. (2) Real-time Inference (as described above). Given a domain of website or URL x, the pre-trained local classifier and graph G and node predictions, this case aims to predict the label for x in real time manner. During inference, if $x \in G$, then the prediction could be given directly. If x not in G, then processor 301 investigates all hyperlinks $H_x$ in the HTML content of x. If $\exists x' \in H_x$ & $x' \in G$, processor 301 calculates the PIR for x, and performs the global propagation using the top k important neighbours of x to get the final prediction of x on the aggregated feature embeddings via the Inference Incorporation (II) strategy. If no candidate in $H_x$ belongs to G, then processor 301 outputs the prediction using the pre-trained local classifier using the feature of x only.

TABLE 1

PIR-based propagation strategies. LP: Local propagation; GP: Global propagation. X indicates that the related propagation is involved in the strategy, while ○ indicates that the related propagation is not involved in the strategy.

| | Training | | Inference | |
| --- | --- | --- | --- | --- |
| | LP | GP | LP | GP |
| End-to-end Incorporation (EI) | X | X | X | X |
| Training Incorporation (TI) | X | X | X | ○ |

TABLE 1-continued

PIR-based propagation strategies. LP: Local propagation; GP: Global propagation. X indicates that the related propagation is involved in the strategy, while ○ indicates that the related propagation is not involved in the strategy.

| | Training | | Inference | |
| --- | --- | --- | --- | --- |
| | LP | GP | LP | GP |
| Inference Incorporation (II) | X | ○ | X | X |
| Without Incorporation (WI) | X | ○ | X | ○ |

Pruning as Addition Procedure

Based on the output label and trustworthiness value, the extensive O/X lists could be obtained via pruning nodes of the graph according to the label or threshold of the trustworthiness value. This may be achieved through two different pruning strategies.

Shortest Path-Based Pruning

The first strategy is to identify the all the shortest paths from the benign nodes to malicious nodes, and remove all the nodes along this path to cut out parts of the graph that were likely compromised. The aim is to isolate clusters of suspicious and bad domains by removing all paths that lead to these clusters.

Specifically, Dijkstra's Shortest Path Algorithm is applied to search for the shortest path, followed by removing every node in the found path, excluding the benign node and the malicious node. In other words, Dijkstra's Shortest Path Algorithm is applied, followed by via 10 million edges. The Breadth-First Search (BFS) strategy is used to extend the graph until the 6-depth level is reached.

Flow-Based Pruning

The second pruning strategy is to find the most compromised domains in a path is to compute the flow of domains along the paths. The flow of a particular domain is defined as the number of shortest paths from the benign nodes to every malicious domain that passes through that given domain. A higher flow means that more paths to flagged domains pass through that node in the graph, and thus represents the domain's importance in reaching bad domains from the benign nodes. The deepest node with the highest flow for each iteration is found and removed from the graph. After there are no more nodes with the flow, unreachable nodes in the graph can be considered as part of a suspicious cluster.

Specifically, this strategy identifies the most important nodes in the paths to malicious nodes, and removing these from the graph may reduce the reachability of suspicious sites. This strategy prunes the deepest node in a path constructed from the highest flow nodes, which often turns out to be a compromised domain with multiple hidden links to suspicious sites. The algorithm can identify and prune these nodes that lead to the most benign domains while preserving the legitimate domains that are higher on the same path.

Experiments and Evaluation

Setups

Data Settings

Web Crawl: To analyse the disclosed model, experiments are constructed using a large web crawl gathered in February 2021. Associated with the crawl is a web graph with 2 million web domain names as nodes, in which each node represents the homepage of the domain node and each arc between two nodes represents the existence of one or more hypertextual links between the associated pages. The crawl was seeded with a small size of a greenlist of domain names, i.e., the whitelist maintained by an organization. The algorithm uses a web crawler to automatically expand the greenlist, without relying on a third party. Then the Breadth-First Search (BFS) strategy at a specified depth (e.g., six) is adopted to extend the greenlist organically, using the hyperlinks in each domain's homepage as the following target domains. For the experimental analysis, two scales benchmark domain graphs are made: Large dataset (2 million domain and 12 million edges) and Small dataset (10K domain and 50K edges).

Ground truth: Approximately 1-million distinct domain names are labelled using several authoritative blacklists, including PhishTank (http://phishtank.org/), MalwareURL (https://www.malwareurl.com/), malwaredomains.com (https://riskanalytics.com/community/), Zeustracker (https://zeustrack.io/), malwaredomainlist.com (http://www.malwaredomainlist.com/), UT1 blacklists (https://dsi.ut-capitole.fr/blacklists/index_en.php), and Google Safe Browsing (https://safebrowsing.google.com/). Domains that appear for one year (2020) in Alexa Top 10K Global Sites (https://www.alexa.com/topsites) are used as benign domains. The owners of these sites have always maintained these sites well, so they have a good reputation. Malicious domains are further dropped out of the benign domain list. Although there are few False Positive and False Negative samples in the ground truth, it is relatively practical to evaluate this method.

Small and large datasets: To validate the performance of the disclosed method on different scales, two datasets are used: (i) a Small dataset with 10,000 domain nodes (50% allowed and 50% denied nodes) randomly sampled from the ground truth nodes in graph G, and (ii) a Large dataset containing 1M domain nodes (including 50K allowed nodes and 50K denied nodes) randomly sampled from the ground truth nodes. 80% of labelled nodes are used as a training set and the remaining 20% labelled nodes as a testing set. The rest of the indeterminable nodes in the graph serve as the network resource but are not involved in the training and validation due to lack of ground truth for these two size datasets.

Validation Settings

The validation of the disclosed method is two-fold: denied node prediction validation with full ground truth (automatically numeric evaluation), and compromise analysis without ground truth (post-processing and analysis).

Denied node prediction validation: It aims to evaluate the capability of the semi-supervised denied nodes classification, on both 2K and 20K validation sets. The prediction accuracy and false positive rate are used as the evaluation metrics. Due to the restriction of ground truth, the comparison with learning benchmark baselines are only conducted for this validation, in terms of learning capability. The disclosed method is also compared with structural ranking baselines in terms of Precision, Recall, F1 and Accuracy. Further, the portability of the disclosed method is evaluated under real-time inference settings previously discussed and efficiency in real-world deployment previously discussed.

Compromise analysis as post-preprocessing: It aims to confirm the correlation between highly suspicious nodes and on-chain compromised nodes (highly suspicious but with benign labels), and analysing the underlying indicators of compromising. The high suspicious score can be considered as alarms for attention. 92 flagged nodes are manually validated from the detected on-chain compromised nodes. Here, the accuracy and uncertain positive alarms are reported that are referred to highly suspicious nodes (flagged nodes) without obviously suspicious information found. The manual check considers the following criteria: (1) a compromised node is on the path from allow nodes to denied nodes; (2) a compromised node is in the allow-list; (3) otherwise, a flagged node is an uncertain positive alarm.

Evaluation Metrics

Accuracy. Three metrics are used to measure the performance of this approach, namely True Positive Rate (TPR), False Positive Rate (FPR) and accuracy (ACC) respectively.

$$TPR = \frac{|TPs|}{|TPs| + |FNs|}, \quad (11)$$

$$FPR = \frac{|FPs|}{|TNs| + |FPs|},$$

$$ACC = \frac{|TPs| + |TNs|}{|TPs| + |TNs| + |FPs| + |FNs|}$$

The same number of benign domains are randomly selected with malicious domains which are fed to adopt K-fold cross-validation (in this paper, K=5). learning curves, and receiver operating characteristic (ROC) curves. Learning curves show a convergence of learning and fluctuation in performance. ROC curves also show the diagnostic ability of a classifier as its T varies.

Baseline Methods

To demonstrate the performance of the disclosed method, four types of baselines are used for comparison.

Individual Machine Learning Baselines (IML): Supervised machine learning approaches (such as Support Vector Machine, MLP, etc.) on the individual node feature only.

Structural Processing Only Baselines (SPO): TrustRank, PageRank, and Pruning-based approaches on the web graph without individual features for domain recognition.

Graph Neural Network Baselines (GNN): Graph neural network approaches, e.g., GCN and graph attention networks (GAT). The method is set with the same number of parameters with GCN for a fair comparison, i.e., two layers with h=64 hidden units.

Scale Graph Neural Network Baselines: Other graph neural network approaches.

Results

Accuracy Evaluation

Figure 10:
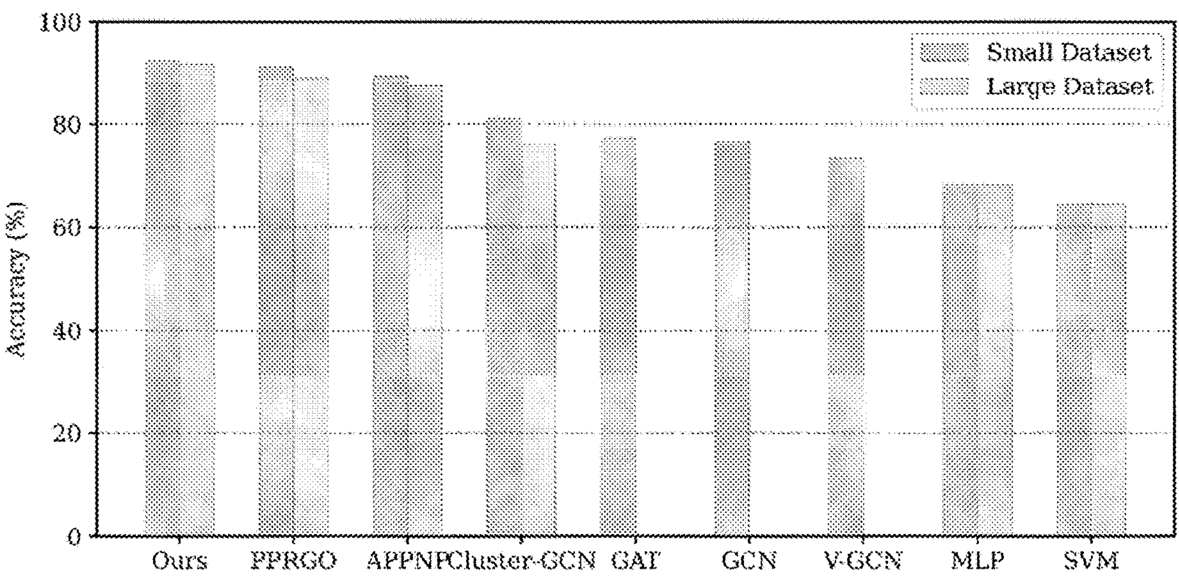
FIG. 10 illustrates overall accuracy of different models on two size of datasets.

FIG. 10 illustrates overall accuracy of different models on two size of datasets. In other words, FIG. 10 illustrates the overall accuracy of each model on small and large-scale datasets using the default settings, revealing the performance of each method. This model outperforms the fully supervised machine learning and graph neural networks and separate learning variants baseline models for the small size dataset. The ordinary GNNs are out of memory with no records for the large-scale, dataset, while the model exceeds the other baseline models on the large-scale dataset as well.

Findings on Compromised Nodes

Based on the experimental results, the disclosed method pruned 1,138 allowed nodes as compromised nodes, which stand around 2.10% of 54,112 nodes in the extended allow-list, i.e., 2.10% of allowed nodes (that are determined by third-party tools and manual analysis) are directly or indirectly connected to nodes in deny-lists and should not be involved in an allow-list. Further, a manual review was conducted on the detected compromised nodes. Specifically, four expert researchers (two co-authors and two external experts) manually checked the nodes lying on the path from detected compromised nodes to denied nodes, analysing the HTML source code, the content of web page, and the service provided by the website. The four experts are separated into two groups and each group reports a node as a compromised node once the evidence of connectivity between a detected compromised node and a denied node is found. If the decision on a node does not match, the two groups will exchange opinions and have sufficient discussions until an agreement is reached. Due to the large scale of the graph, which leads to significant manual efforts, 22 (2%) detected compromised nodes were randomly sampled in the manual review. Finally, 21 out of the 22 sampled nodes are validated as true positives (the incorrectly recognized website is based on the unsafe website builder platform that has caused some websites to be compromised), i.e., the true positive rate of the disclosed method is 94.56%.

Learning Capability Evaluation for Denied Node Prediction

The learning capability of the disclosed method are compared with benchmarks, with respect to the accuracy of classification based on the initial ground truth. FIG. 10 displays the node classification accuracy of each model on small and large datasets using the default settings. The suspicion threshold was set to 0.5 to classify allowed and denied nodes. On a Small dataset, the disclosed method achieves 92.50% accuracy, outperforming the supervised machine learning approaches, graph neural networks, and scale graph neural network baseline models. The disclosed method exceeds the other baseline models on the large-scale dataset as well. Note that the commonly adopted GNNs are out of memory when being applied to the Large dataset. The accurate performance on the initial ground truth indicates that the learning capability of the disclosed method outperforms other approaches. As the well-labelled nodes are limited to obtain in real-world applications, the performance of the disclosed method with various labelling rates is evaluated, i.e., the proportion of labelled training samples in the dataset. In particular, a lack of labelled nodes is mimicked by involving fewer training samples in the training phase.

Figure 11:
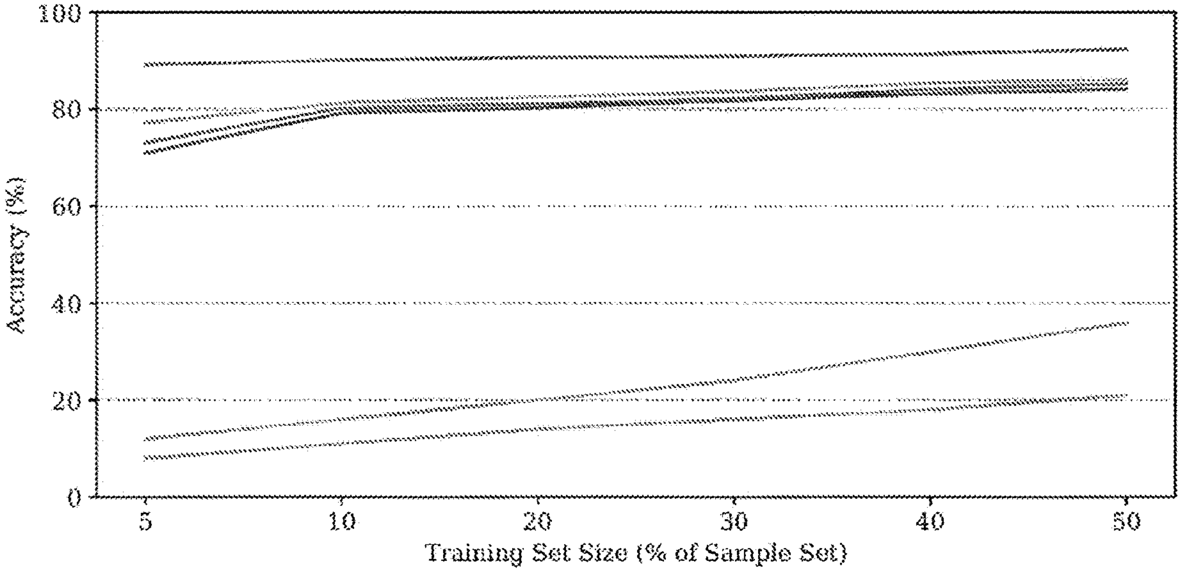
FIG. 11 illustrates accuracy for different training set sizes on small dataset.

FIG. 11 illustrates accuracy for different training set sizes on small dataset. In other words, FIG. 11 reports the accuracy of the disclosed method on different training configurations. Note that only the comparison on a Small dataset is performed. The experimental results indicate that the disclosed method outperforms all GNN-based approaches, especially in the more sparsely labelled scenarios. The reason is that the PIR-based global propagation benefits from obtaining important information from remote neighbours, instead of the 2-hop neighbours for most of the existing GNNs. Similarly, without global propagation, the performance of individual machine learning baselines drops down significantly when fewer training samples are provided.

FIG. 12 illustrates the accuracy when varying teleport probability $\alpha$ (FIG. 12*a*) and k (FIG. 12*b*). It was investigated how hyperparameters $\alpha$ and top-k affect the accuracy of the node classification. As shown in FIG. 12, the node classification accuracy increases with an increasing hyperparameter $\alpha$ until it reaches its maximum at around 0.18. When the hyperparameter top-k value is increased, the accuracy of node classification increases sharply before 40 and then levels off. This demonstrates that it is possible to empirically find an effective a and top-k to achieve the best accuracy.

Comparisons with Structural Ranking Baselines

The aforementioned invisible link injection attack aims to increase the PageRank score or similar web ranking algorithm scores of suspicious sites to fool search engines, so it is called ranking attacks. Therefore, existing ranking-based evaluations can be manipulated by adversaries to boost their scores, and their performances are reduced significantly. These ranking-only approaches result are further demonstrated in low precision, recall, and F1-score, as shown in Table 2. Each node starts with a score of 1/(number of nodes), and then is divided by its children equally. The converged ranking values are normalized between 0 and 1.

Considering that there are 50% of allowed and 50% of denied samples in the dataset, the threshold that splits the dataset equally is for selected. For example, in PageRank, about half of the samples (46.20%) have ranking scores higher than 0.1. The threshold is then further varied to other values, e.g., 0.2, 0.3, 0.4, and 1.0 in PageRank; as in practice, it is difficult to know in advance how the positive and negative samples are distributed in the dataset. According to the results presented in Table 2, regardless of the varying thresholds, the PageRank only achieves precision around 50% (49.67% to 53.06%), which indicates that roughly half of positive predictions are incorrect. The recall presents how many positive samples are correctly detected as positive. Note that, even when the threshold is set to 1, there are 2.56% of positive samples not detected as they have a PageRank score equal to 1.

TABLE 2

Trust evaluation using structural ranking only.

| Method | Threshold | Precision | Recall | F1-score | Accuracy |
|---|---|---|---|---|---|
| PageRank | 0.1 | 53.06% | 66.67% | 59.09% | 54.43% |
| | 0.2 | 50.41% | 78.21% | 61.31% | 51.27% |
| | 0.3 | 50.40% | 80.77% | 62.07% | 51.27% |
| | 0.4 | 50.71% | 91.03% | 65.14% | 51.90% |
| | 1.0 | 49.67% | 97.44% | 65.80% | 50.00% |
| TrustRank | 0.001 | 52.58% | 65.38% | 58.29% | 53.80% |
| | 0.005 | 49.67% | 96.15% | 65.50% | 50.00% |
| | 0.100 | 49.67% | 97.44% | 65.80% | 50.00% |
| | 0.200 | 49.68% | 98.72% | 66.09% | 50.00% |
| | 0.300 | 49.49% | 99.23% | 66.04% | 49.62% |
| | 0.400 | 49.46% | 99.36% | 66.04% | 49.56% |
| | 1.000 | 49.40% | 99.62% | 66.04% | 49.43% |
| Step | 3 | 52.16% | 97.89% | 68.06% | 54.05% |
| | 4 | 53.20% | 97.44% | 68.82% | 55.85% |
| | 5 | 53.20% | 88.38% | 66.41% | 55.31% |
| | 6 | 51.09% | 67.76% | 58.26% | 51.45% |
| | 7 | 47.55% | 36.26% | 41.14% | 48.13% |
| Discount | 0.4 | 51.07% | 97.99% | 67.14% | 52.05% |
| | 0.5 | 51.06% | 92.77% | 65.87% | 51.93% |
| | 0.6 | 47.51% | 75.23% | 58.24% | 46.06% |
| | 0.7 | 43.40% | 53.93% | 48.09% | 41.80% |
| | 0.8 | 36.88% | 24.75% | 29.62% | 41.20% |
| | 0.9 | 28.73% | 5.71% | 9.53% | 45.77% |

Static and Real-time Inference Evaluation

The performances of different incorporation schemes (i.e., End-to-end Incorporation, Inference Incorporation, Training Incorporation, and Without Incorporation) of the PIR-based propagation are compared according to the accuracy of the classification, as shown in FIG. 8. For the Without Incorporation strategy, each node is treated independently and trained the local prediction neural network using only the node feature. As shown in in FIG. 8, the disclosed method with End-to-end Incorporation achieves the best accuracy performance (more than 90%) compared to other strategies. The End-to-end Incorporation strategy, i.e., the complete implementation of the disclosed method, enhances the accuracy by nearly 30%, compared to the WI scenario where the disclosed method only considers individual features of the nodes.

The other two strategies are also compared, namely Training Incorporation and Inference Incorporation (involving propagation only during the inference phase), with the Without Incorporation case. By involving structural information only during the training phase, the disclosed method achieves an 86.12% accuracy, which still outperforms individual machine learning baselines, graph neural network baselines, and structural processing only baselines. Compared to some of the large-scale graph neural network baselines, the TI strategy shows a slight gap in accuracy (around 3% to 5%). However, considering the time efficiency of the disclosed method, it is feasible and efficient to implement the disclosed method with a TI strategy in practice. Finally, even for the Inference Incorporation (involving structural information only during the inference phase), the accuracy increases by 12% compared to without propagation case. Considering that the training time and complexity are reduced by removing the propagation during training, it is feasible to consolidate the disclosed method to pre-trained classifiers without neighbours' information taken into account, achieving a notable accuracy enhancement.

Efficiency in Real-world Deployment (Scalability and Efficiency Evaluation)

FIG. 13 illustrates training time of different models on two size of datasets. The average training time per epoch is evaluated, as well as other baselines, deployed on a real-world server (Ubuntu OS, with NVIDIA Quadro RTX 4000 8 GB GPU and i7 9900 32G CPU). From FIG. 13, one can see that the disclosed method is around two orders of magnitude faster than GCN and GAT on the small size dataset by avoiding the iteratively adjacent matrix processing and global propagation, and 10× faster than APPNP via avoiding a higher number of matrix multiplications. For large-scale dataset, the runtime time (training and inference time) of the disclosed method is less than 5s and is two orders of magnitude faster than other separate learning variants baseline models.

Besides, the disclosed method uses less memory overall compared to other baseline models in the single machine setting, especially on large-scale graphs. For a small-scale dataset, the disclosed method uses 1.5 GB of memory compared to more than 2 GB for Cluster-GCN and APPNP. The memory scales with graph size, while the disclosed method has modest gains of memory, increasing to 10 GB on the large-scale dataset, compared to more than 20 GB for PPRGO and out-of-memory for APPNP and Cluster-GCN. It is demonstrated that this PIR estimation mechanism effectively bypasses pre-processing and space overheads, enabling the global propagation procedure more suitable for large graphs with frequent updates.

The training on a very large-scale graph with billions of nodes may face significant overheads. To address this challenge, system optimization is explored by reducing the scale of nodes involved in the training procedures while maintaining accuracy. The performance of the node classification model is examined when training is conducted on only a subset of nodes, i.e. transferability of the node classification model.

Figure 14:
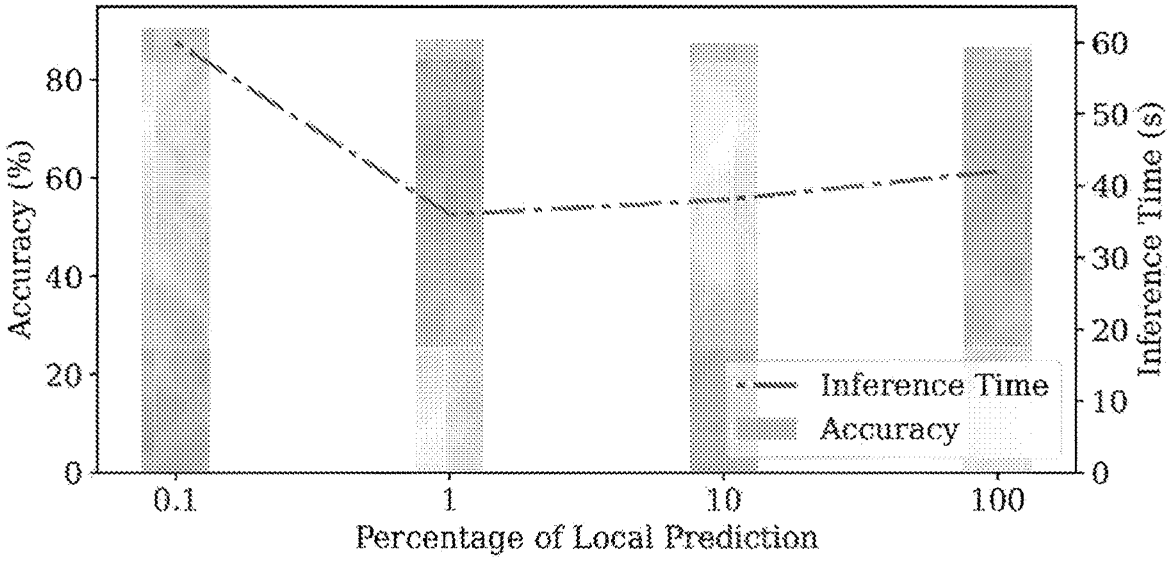
FIG. 14 illustrates a demonstration of the transferability of the local prediction model.

FIG. 14 illustrates a demonstration of the transferability of the local prediction model. It is found that the accuracy of the model has little change when the update of the local prediction neural network is only conducted for a small, random subset of nodes. As can be seen from FIG. 14, the accuracy only decreases by about 0.6 percentage when reducing the amount of inferred nodes by a factor of 10. It is demonstrated the feasibility to further reduce the training cost. Additionally, the inference time does not change much when varying the percentage of location prediction.

Figure 15:
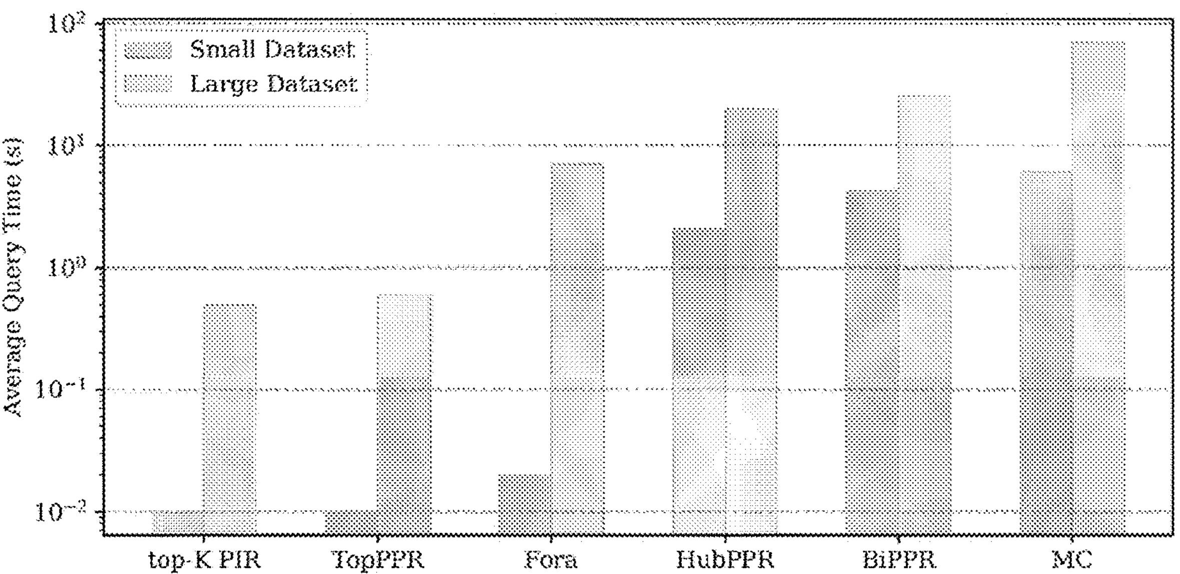
FIG. 15 illustrates top-k PIR performance evaluation.

FIG. 15 illustrates top-k PIR performance evaluation. The performance of top-k neighbour estimation between top-k PIR and MC ($\sqrt{1-\alpha}$ random walks) and FORA ($\delta=p_f=1/n$, $\grave{o}=0.5$) is evaluated. In an example, 100 times top-1000 queries are conducted for each method, and the average query time is reported. As demonstrated, this top k PIR estimation outperforms all competitors in terms of query time for both size settings, less than 1 seconds on average to handle the huge graph compared to FORA 70 seconds. The space cost of top-k PIR for index and graph size are only 411.9 MB and 130.8 MB respectively on the huge graph. Besides, for the precision over these top-1000, the top-k PIR indeed achieves precision at 100%.

Figure 16:
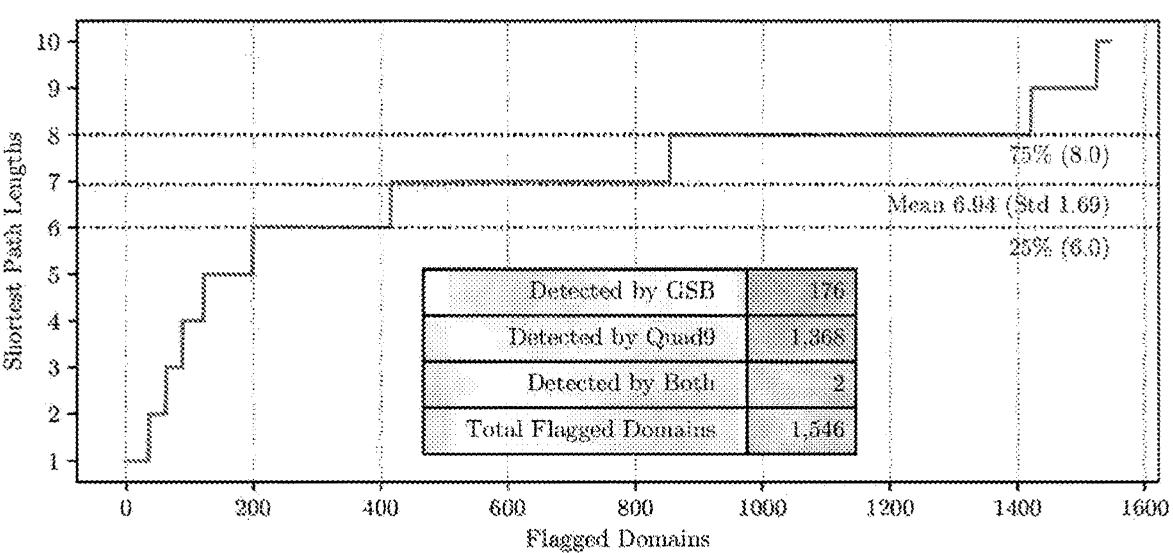
FIG. 16 illustrates overall performance evaluation when varying the number of training samples.

FIG. 16 illustrates overall performance evaluation when varying the number of training samples. The scalability and accuracy are relevant to PIR approximation relevant parameter $r_{max}$, and propagation relevant parameter k. The effect on the performance of this method when varying $r_{max}$ and k at fixed other parameters is evaluated, using the averaged accuracy after 10 times repetitions. The experiment is then repeated five times and the mean performance is reported. It is found that the average accuracy consistently raises when increasing k or decreasing $r_{max}$. It means a more accurate approximation of the PIR vector or considering more top-k neighbours could improve the accuracy. Besides, the difference between the highest accuracy and lowest accuracy is tiny (<2%), which means the algorithm is not sensitive to the k and $r_{max}$. Besides, the performance of the model starts to be stable from the k=32, for any $r_{max}$ settings. Therefore, it is possible to find suitable hyper-parameters with a smooth trade-off between accuracy and computation cost in real-world deployment.

One significant function of this method is to detect potential malicious domains. The redundancy of multi-domain names provides better flexibility for malware. Therefore, detection of newly generated (zero-day) and rarely used malicious domains is an important metric of the system. When the model is directly applied on domains that are not in ground truth, 6109 potentially suspicious malicious domains are found from the non-labelled nodes.

Aggregated Measurement and Discussion

A possible reason for such compromised sites could be breached within their open-source content management systems (i.e., WordPress themes). Their inherent nature likely precludes intentional legitimate addition by website owners, and implies exploited security vulnerabilities. Such sites can often be identified via deeper inspection of their HTML, through which the suspicious links can be found positioned off-screen or made invisible.

Figure 17:
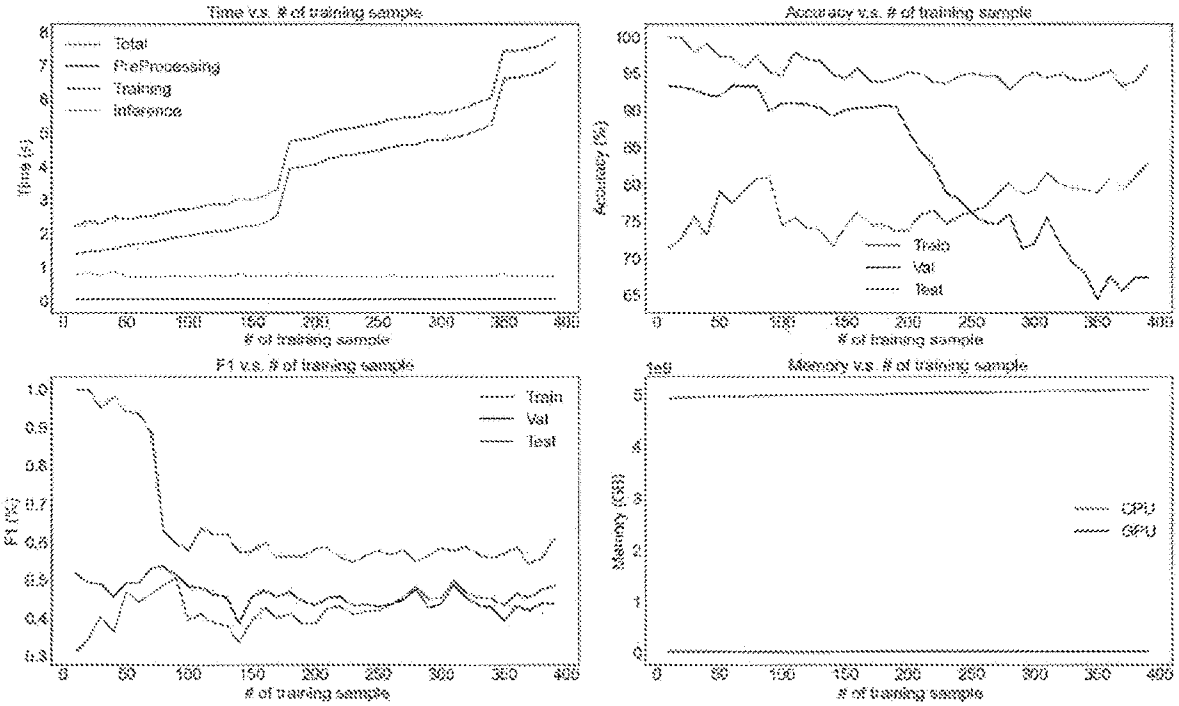
FIG. 17 illustrates an aggregation of the number of hops from supposed trusted nodes to all discovered flagged nodes.

FIG. 17 illustrates an aggregation of the number of hops from supposed trusted nodes to all discovered flagged nodes. At a high level, the typical 2-hop investigative scope of existing GNNs would be bypassed by such stealthy attacks. This can be seen in FIG. 17, where the number of hops in paths from supposed trusted nodes (i.e., compromised sites) are aggregated to confirmed flagged nodes. This shows that the mean number of hops stands at 6.94, with a σ of 1.69. In fact, the 25th percentile stands at 6 hops, meaning the majority of flagged nodes are buried deep along the paths from the compromised sites. This alludes to the need for deeper investigative scopes in future approaches.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for classifying a test website, the method comprising:
   - for each of multiple neighbour websites, calculating an importance value between the test website and one of the multiple neighbour websites, each of the multiple neighbour websites being connected to the test website by way of one or more hyperlinks;
   - building a graph of nodes and directed edges, a node representing a website and a directed edge representing a hyperlink between websites;
   - for each node in the graph, calculating a classification value and classifying the node based on the classification value, wherein at least one node is a website on a whitelist, corresponding to a predetermined classification value;
   - selecting one or more of the multiple neighbour websites on the graph, based on the importance value corresponding to the one or more of the multiple neighbour websites;
   - for each website in the selected one or more of the multiple neighbour websites and the test website;
     - determining content features for the website; and
     - evaluating a trained machine learning model for the website, based on the content features to calculate multiple output values for the website, wherein the trained machine learning model is trained by calculating a classification value for each node on the graph and minimising a cost between the classification value and node labels obtained from a whitelist and/or blacklist and aggregating corresponding output values from a pre-trained machine learning model for each of the test website and the selected one or more of the multiple neighbour websites to calculate the classification value for each node on the graph; and
   - aggregating corresponding output values for each of the test website and the selected one or more of the multiple neighbour websites to calculate a classification value that classifies the test website.

2. The method of claim 1, wherein aggregating the corresponding output values is based on a relationship between the test website and selected one of more of the multiple neighbour websites.

3. The method of claim 1, wherein selecting one or more of the multiple neighbour websites comprises selecting one or more neighbour websites with importance values over an importance threshold.

4. The method of claim 1, wherein calculating the importance values between the test website and one of the multiple neighbour websites comprises propagating a parameter related to the importance value between the test website and the multiple neighbour websites to calculate, for each of the multiple neighbour websites, the importance value based on the parameter.

5. The method of claim 4, wherein calculating the importance value comprises updating the importance value by adding the parameter multiplied by a weight factor.

6. The method of claim 4, wherein the method further comprises initialising the parameter based on whether the test website links to a malicious website and initialising the parameter comprises dividing the parameter of a first website among websites that link to the first website.

7. The method of claim 4, wherein the parameter is based on a number of the neighbour websites that link to a malicious website.

8. The method of claim 4, wherein
   - propagating the parameter comprises selecting one of the multiple neighbour websites based on the parameter calculated for that one of the multiple neighbour websites and propagating the parameter from the selected one of the multiple neighbour websites and
   - the method comprises setting the parameter of the selected one of the multiple neighbour websites to a predefined value after propagating the parameter, to indicate that the selected one of the multiple neighbour websites has been processed.

9. The method of claim 4, wherein the method further comprises
   - terminating the propagating in response to the parameter for the multiple neighbour websites being below a termination threshold and
   - performing random walks from a starting website, selected from the test website and the multiple neighbour websites, based on the parameter after terminating the propagating, to update the importance value of the starting website.

10. The method of claim 1, wherein the classification value is a probability of the test website being malicious or compromised in a cyber-attack.

11. The method of claim 1, wherein the multiple output values for each website in the selected one or more of the multiple neighbour websites and the test website is a representation of embedded features.

12. The method of claim 1, wherein each of the test website and the selected one or more of the multiple neighbour websites comprises a primary domain.

13. The method of claim 1, wherein the method further comprises, after classifying each node in the graph, pruning the nodes of the graph according to their classification.

14. The method of claim 1, wherein aggregating the corresponding output values comprises calculating a weighted sum of the corresponding output values and converting the output values into a probability distribution.

15. The method of claim 1, wherein determining features related to content comprises determining a frequency of words used in the content from a dictionary of words, generating a numeric feature vector for each website in the selected one or more of the multiple neighbour websites and the test website and using the numeric feature vector as an input to the trained machine learning model.

16. The method of claim 1, wherein the trained machine learning model comprises a neural network with exactly two output values.

17. A non-transitory computer readable medium with software code stored thereon that, when executed by a computer, causes the computer to perform the method of claim 1.

18. A computer system for classifying a test website, the computer system comprising:
   - a processor configured to:
   - for each multiple neighbour websites, calculate an importance value between the test website and one of the multiple neighbour websites, each of the multiple neighbour websites being connected to the test website by way of one or more hyperlinks;

build a graph of nodes and directed edges, a node representing a website and a directed edge representing a hyperlink between websites;

for each node in the graph, calculate a classification value and classifying the node based on the classification value, wherein at least one node is a website on a whitelist, corresponding to a predetermined classification value;

select one or more of the multiple neighbour websites on the graph, based on the importance value corresponding to the one or more of the multiple neighbour websites;

for each website in the selected one or more of the multiple neighbour websites and the test website:

determine content features for the website, and evaluating a trained machine learning model for the website, based on the content features to calculate multiple output values for the website, wherein the trained machine learning model is trained by calculating a classification value for each node on the graph and minimising a cost between the classification value and node labels obtained from a whitelist and/or blacklist and aggregating corresponding output values from a pre-trained machine learning model for each of the test website and the selected one or more of the multiple neighbour websites to calculate the classification value for each node on the graph; and aggregate corresponding output values for each of the test website and the selected one or more of the multiple neighbour websites to calculate a classification value that classifies the test website.

* * * * *